ized Oracle

United States Patent
Jang et al.

(10) Patent No.: US 11,359,518 B2
(45) Date of Patent: Jun. 14, 2022

(54) COMBINED CYCLE POWER PLANT

(71) Applicant: DOOSAN HEAVY INDUSTRIES & CONSTRUCTION CO., LTD., Changwon-si (KR)

(72) Inventors: Jun Tae Jang, Seoul (KR); Sang Hyeun Kim, Yongin-si (KR); Hwa Chang Sung, Seoul (KR); Gon Joo Lee, Seongnam-si (KR); Song Hun Cha, Osan-si (KR)

( * ) Notice: Subject to any disclaimer, the term of this patent is extended or adjusted under 35 U.S.C. 154(b) by 619 days.

(21) Appl. No.: 15/983,057

(22) Filed: May 17, 2018

(65) Prior Publication Data

US 2018/0340453 A1 Nov. 29, 2018

(30) Foreign Application Priority Data

May 25, 2017 (KR) .................. 10-2017-0064743
Jun. 21, 2017 (KR) .................. 10-2017-0078498

(51) Int. Cl.
*F01K 23/10* (2006.01)
*F02C 7/143* (2006.01)
(Continued)

(52) U.S. Cl.
CPC .............. *F01K 23/10* (2013.01); *F02C 6/003* (2013.01); *F02C 6/18* (2013.01); *F02C 7/143* (2013.01);
(Continued)

(58) Field of Classification Search
CPC ........ F01K 23/10; F01K 25/10; F01K 25/103; F02C 6/28; F02C 7/12; F02C 7/141; F02C 7/16
See application file for complete search history.

(56) References Cited

U.S. PATENT DOCUMENTS 9,410,451 B2 * 8/2016 Laing ...................... F01K 23/10
9,441,504 B2 * 9/2016 Held ...................... F01K 25/103
(Continued)

FOREIGN PATENT DOCUMENTS

CN 1190449 A 8/1998
KR 10-0370910 B1 3/2003
(Continued)

*Primary Examiner* — Todd E Manahan
*Assistant Examiner* — Thuyhang N Nguyen
(74) *Attorney, Agent, or Firm* — Harvest IP Law, LLP

(57) ABSTRACT

A combined cycle power plant is capable of improving power output and power generation efficiency by cooling intake air supplied to a gas turbine. The plant includes a gas turbine power generation system, an operating fluid power generation system, and a cooling system. The gas turbine power generation system includes an air compressor for compressing air supplied through an air incoming path, a gas turbine for generating rotary power by burning a mixture of fuel and the air compressed by the air compressor, and a first generator for generating electricity by using the rotary power of the gas turbine. The operating fluid power generation system heats an operating fluid by using combustion gas discharged from the gas turbine and generates electricity using the heated operating fluid. The cooling system cools air supplied from the air compressor by supplying the operating fluid to an upstream side of the air compressor.

14 Claims, 18 Drawing Sheets

(51) Int. Cl.
*F02C 6/18* (2006.01)
*F02C 6/00* (2006.01)
*F02C 7/16* (2006.01)
*F01K 25/10* (2006.01)

(52) U.S. Cl.
CPC .............. *F02C 7/16* (2013.01); *F01K 25/103* (2013.01); *F05D 2220/32* (2013.01); *F05D 2220/76* (2013.01); *F05D 2260/207* (2013.01)

(56) References Cited

U.S. PATENT DOCUMENTS

| | | | |
|---|---|---|---|
| 9,903,232 B2 * | 2/2018 | Amir | F01K 25/10 |
| 2010/0146978 A1 * | 6/2010 | Feher | F02C 7/143 |
| | | | 60/730 |
| 2011/0138809 A1 * | 6/2011 | Ramaswamy | F01K 25/10 |
| | | | 60/641.2 |
| 2013/0269334 A1 | 10/2013 | Sonwane et al. | |
| 2015/0076831 A1 | 3/2015 | Giegel | |

FOREIGN PATENT DOCUMENTS

| | | |
|---|---|---|
| KR | 10-2014-0064704 A | 5/2014 |
| KR | 10-2014-0101893 A | 8/2014 |
| WO | 2010-151560 A1 | 12/2010 |

* cited by examiner

[FIG 1]
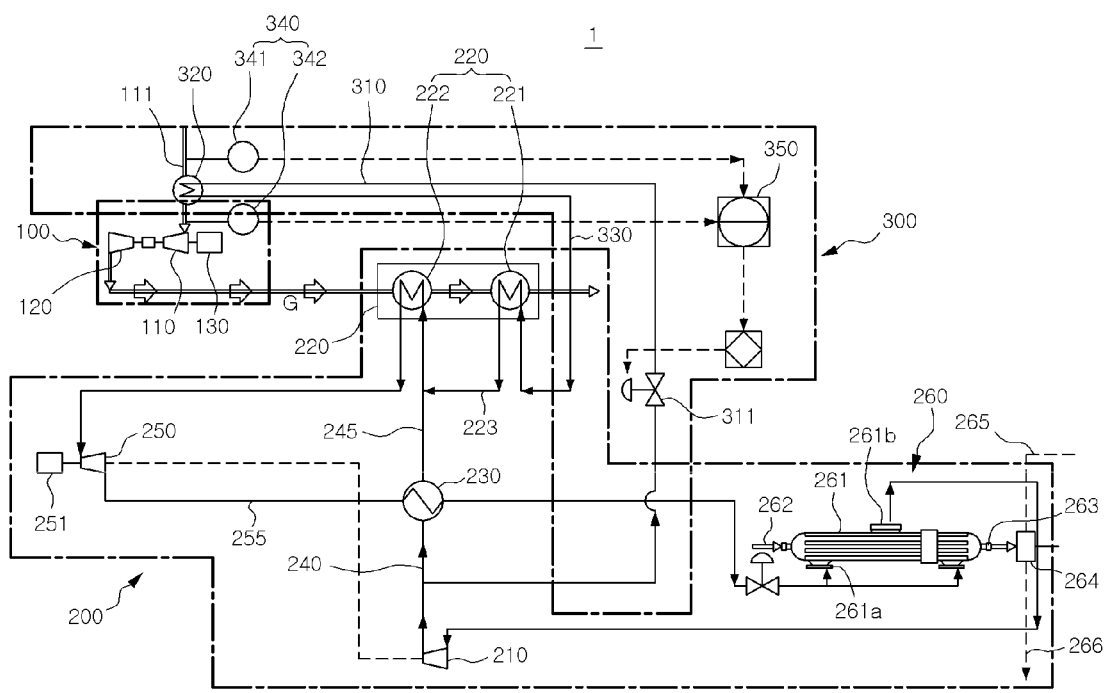

【FIG 2】
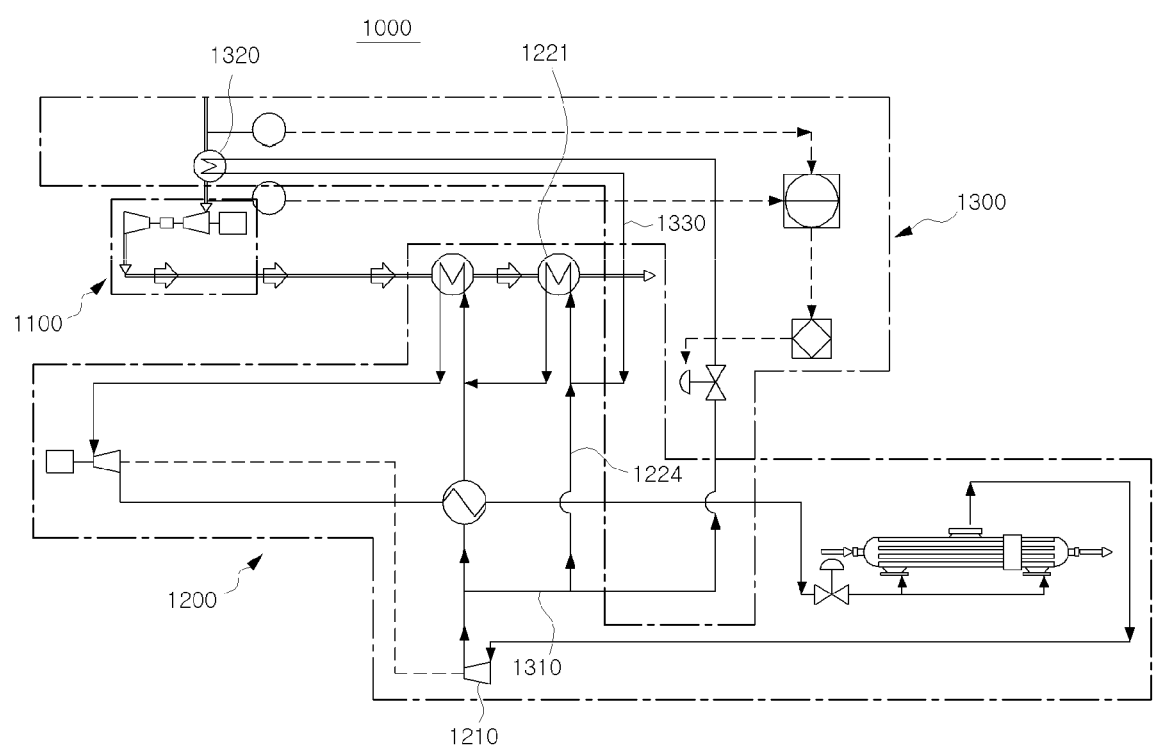

[FIG 3]
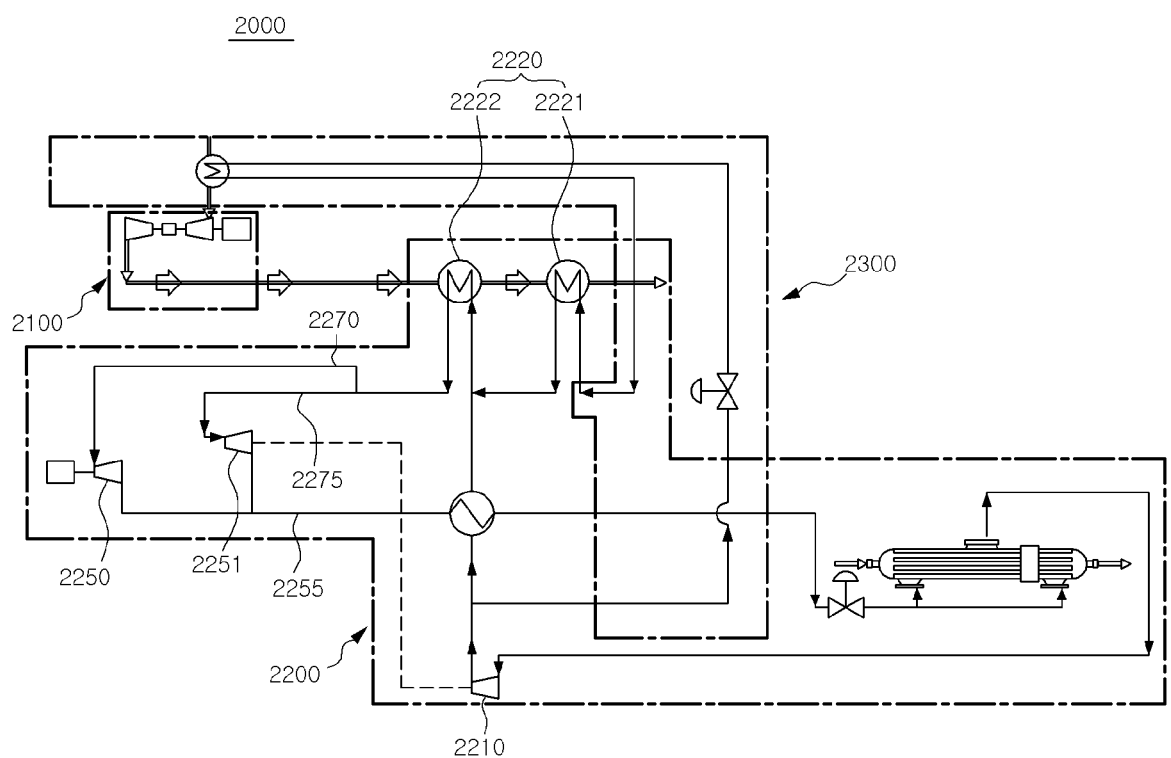

[FIG 4]
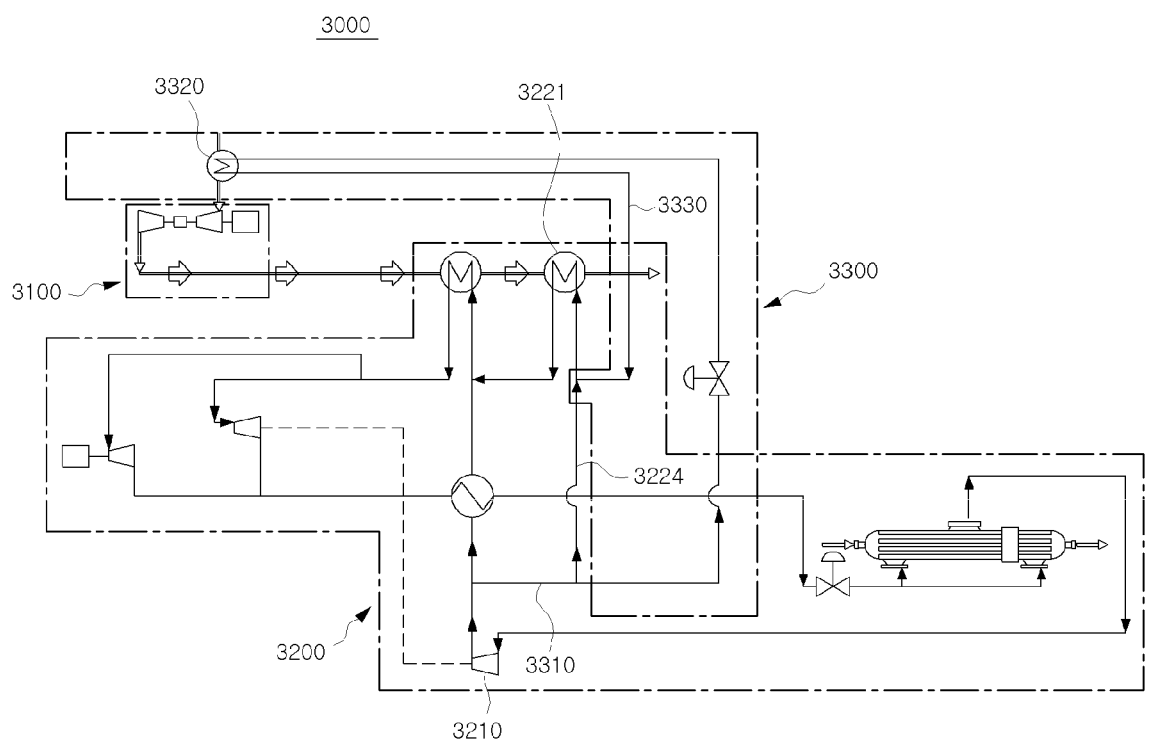

[FIG 5]
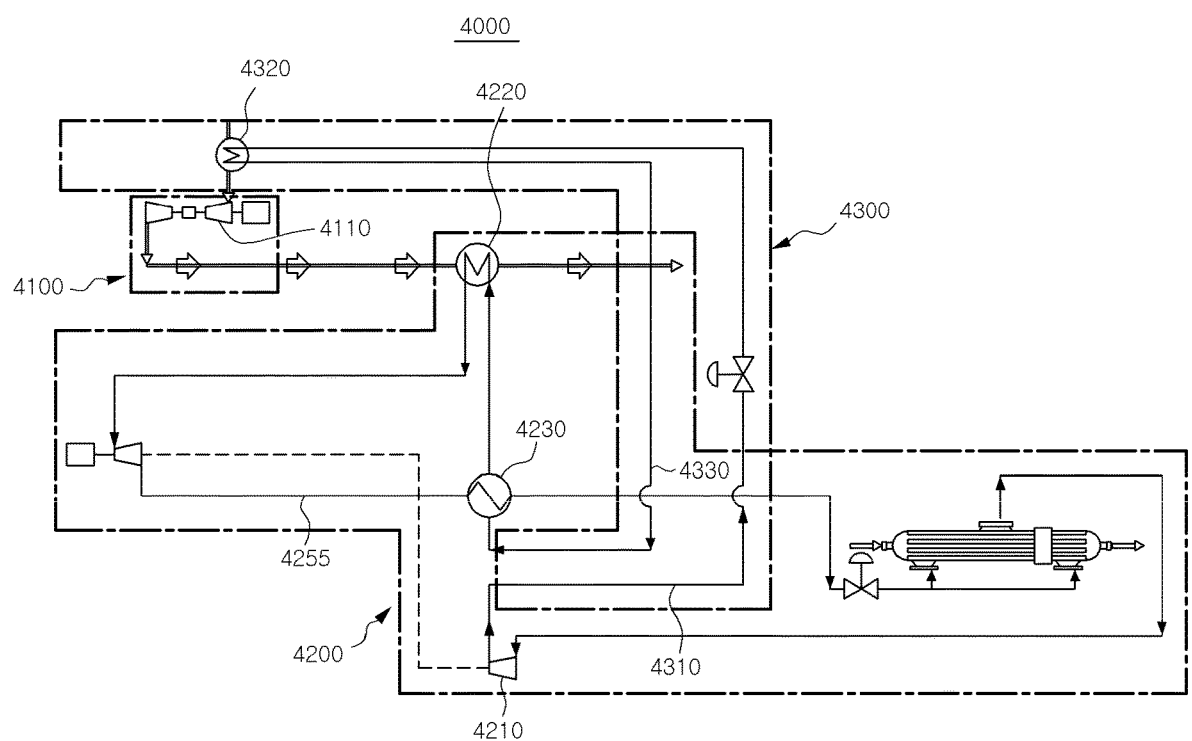

[FIG 6]
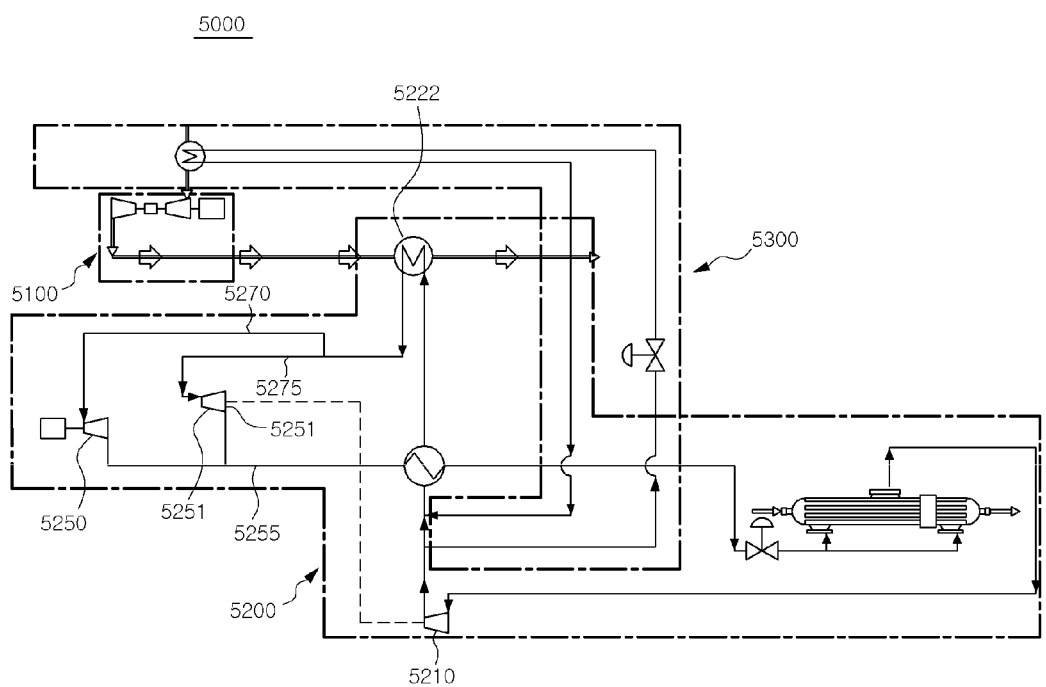

[FIG 7]
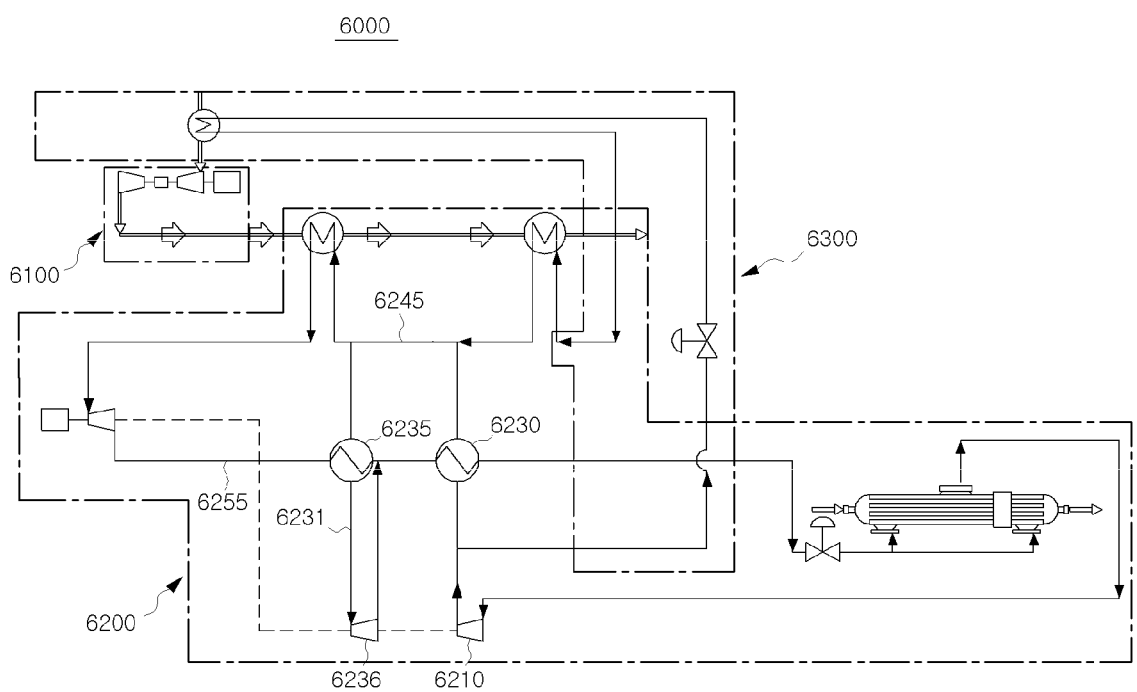

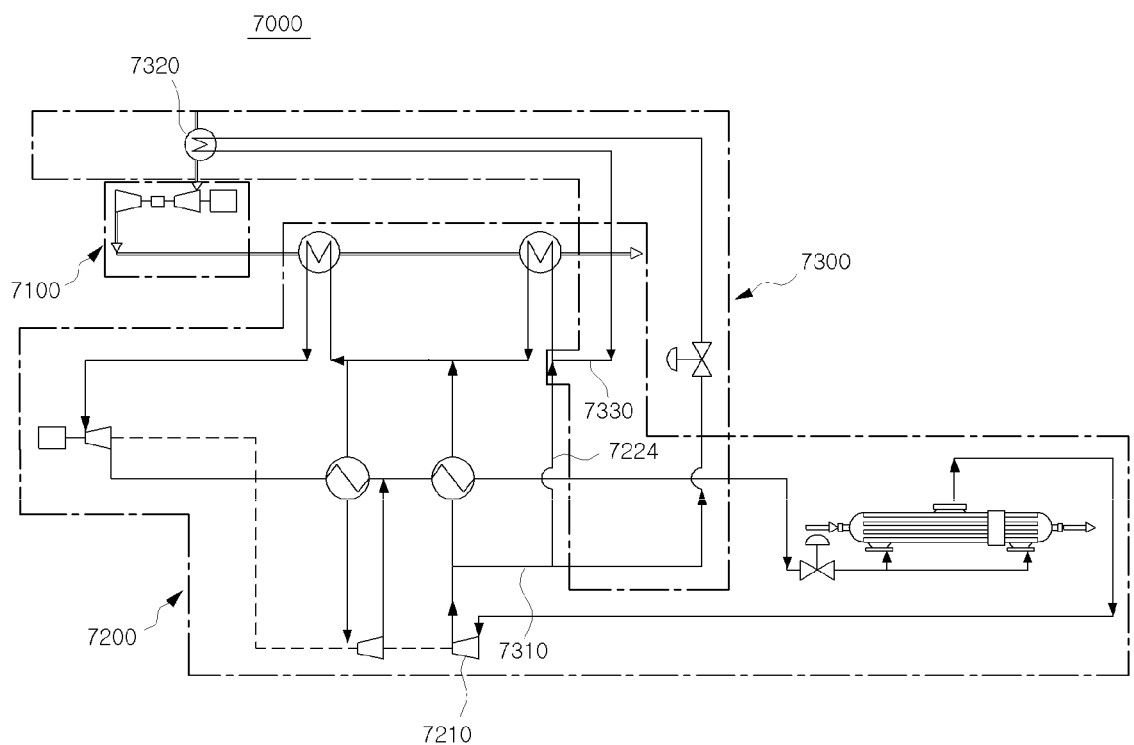

[FIG 9]
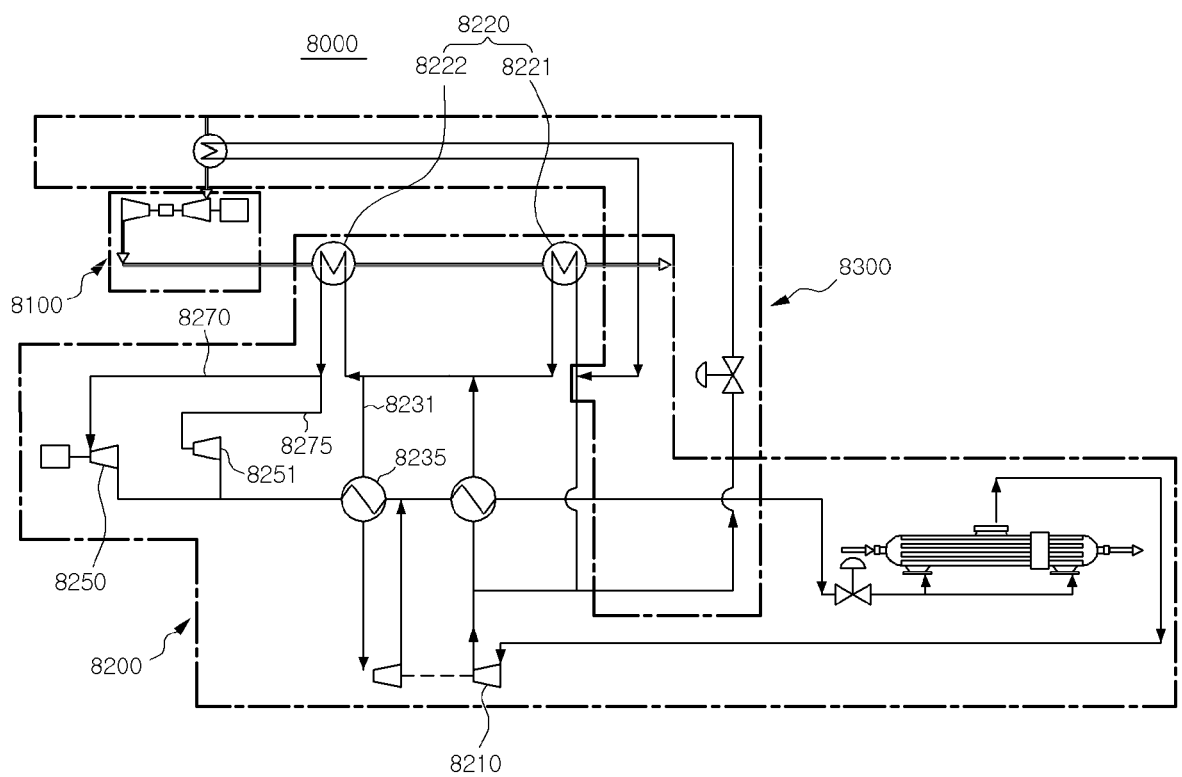

【FIG 10】
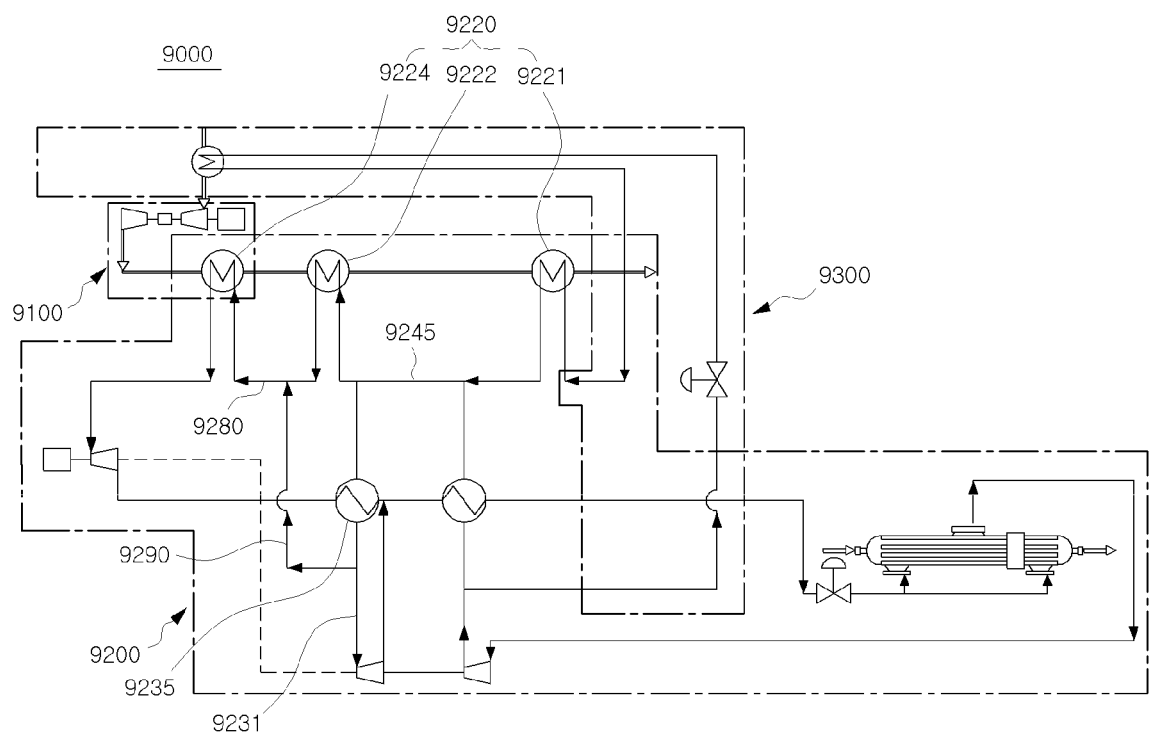

[FIG 11]
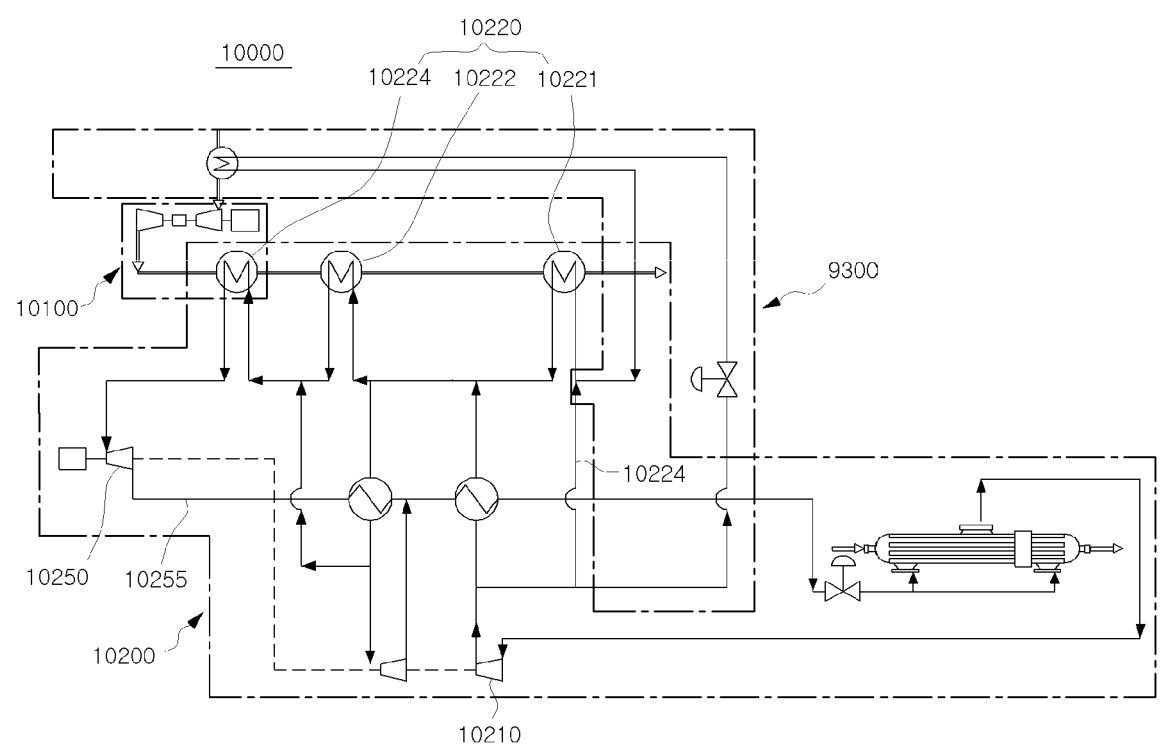

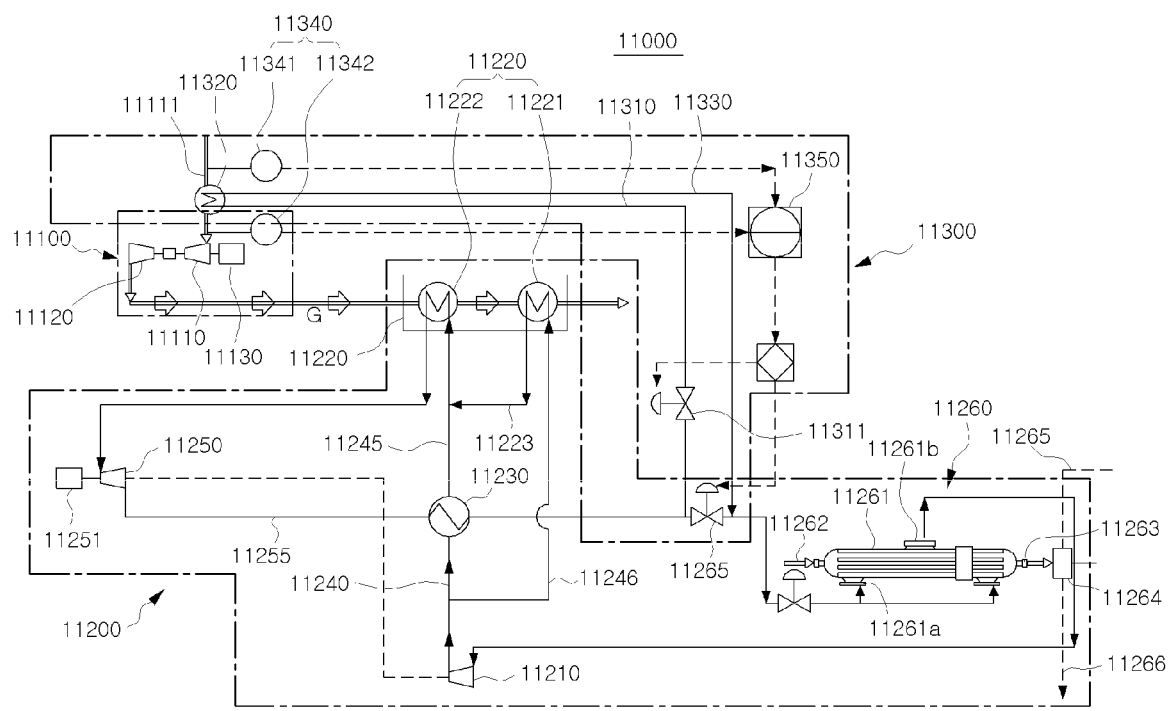
[FIG 12]

[FIG 13]
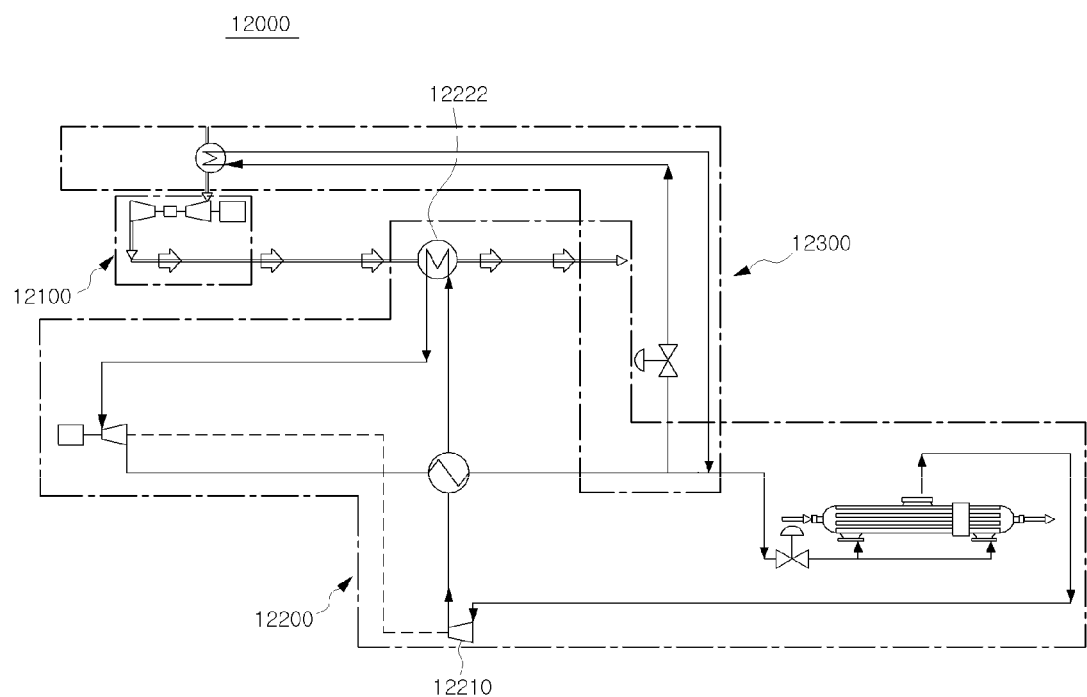

【FIG 14】
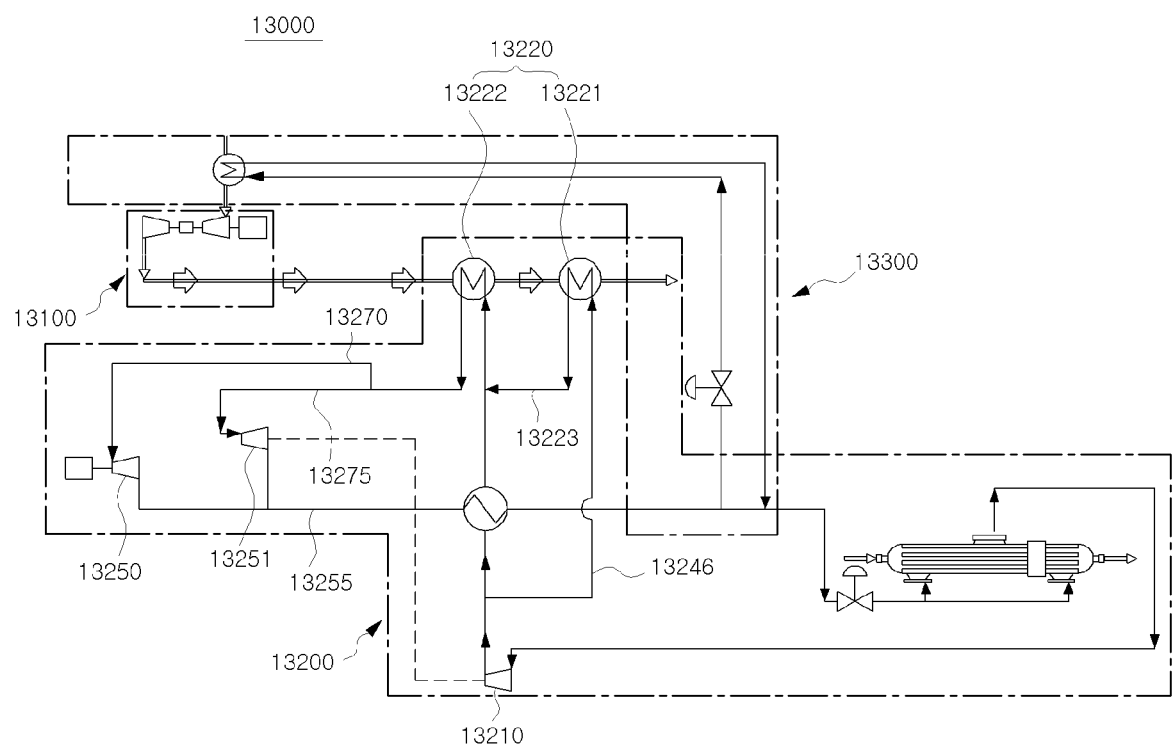

【FIG 15】
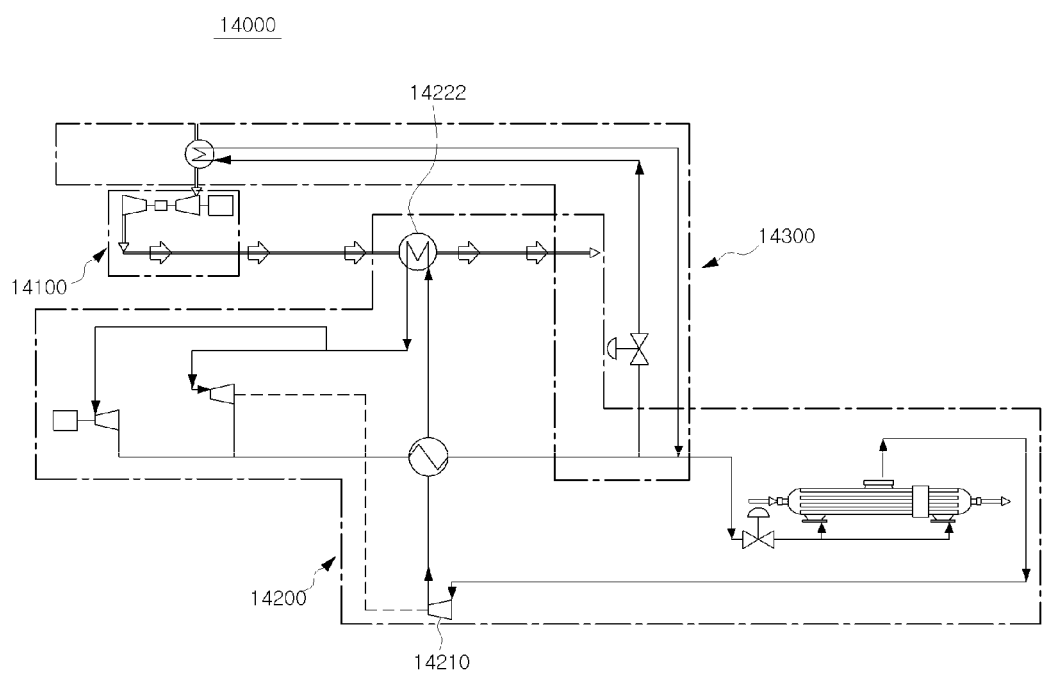

[FIG 16]
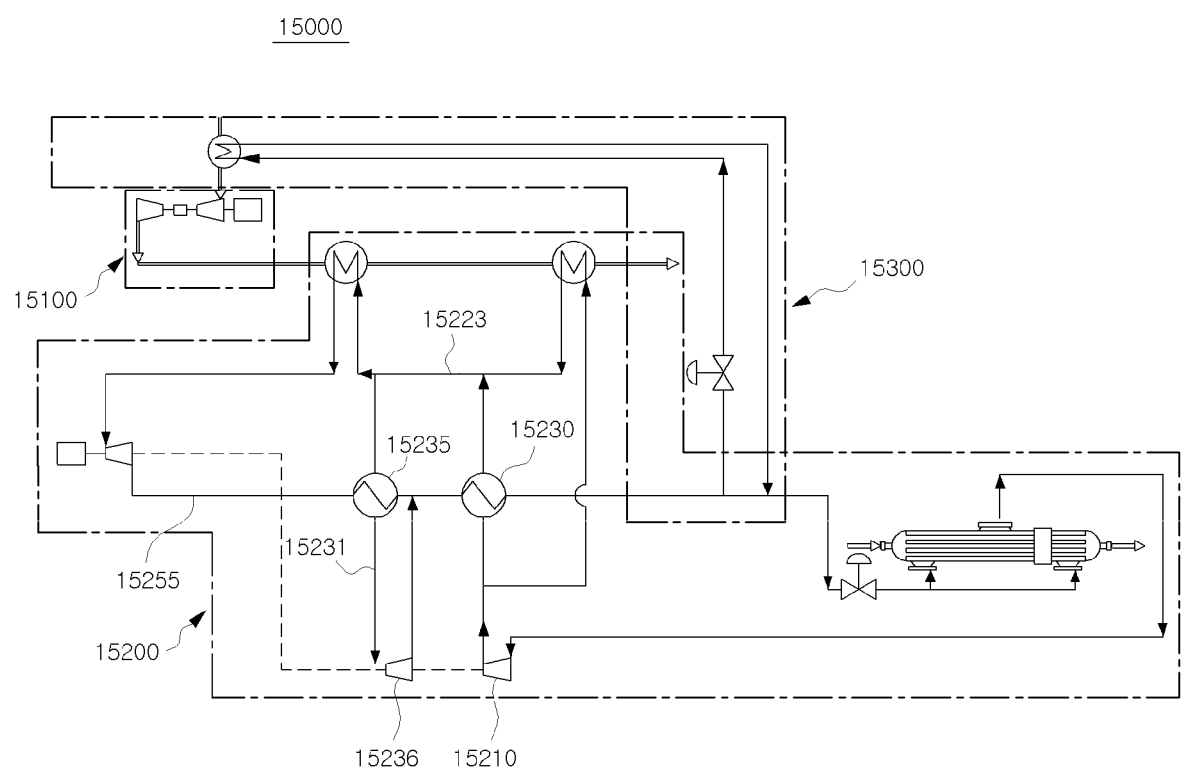

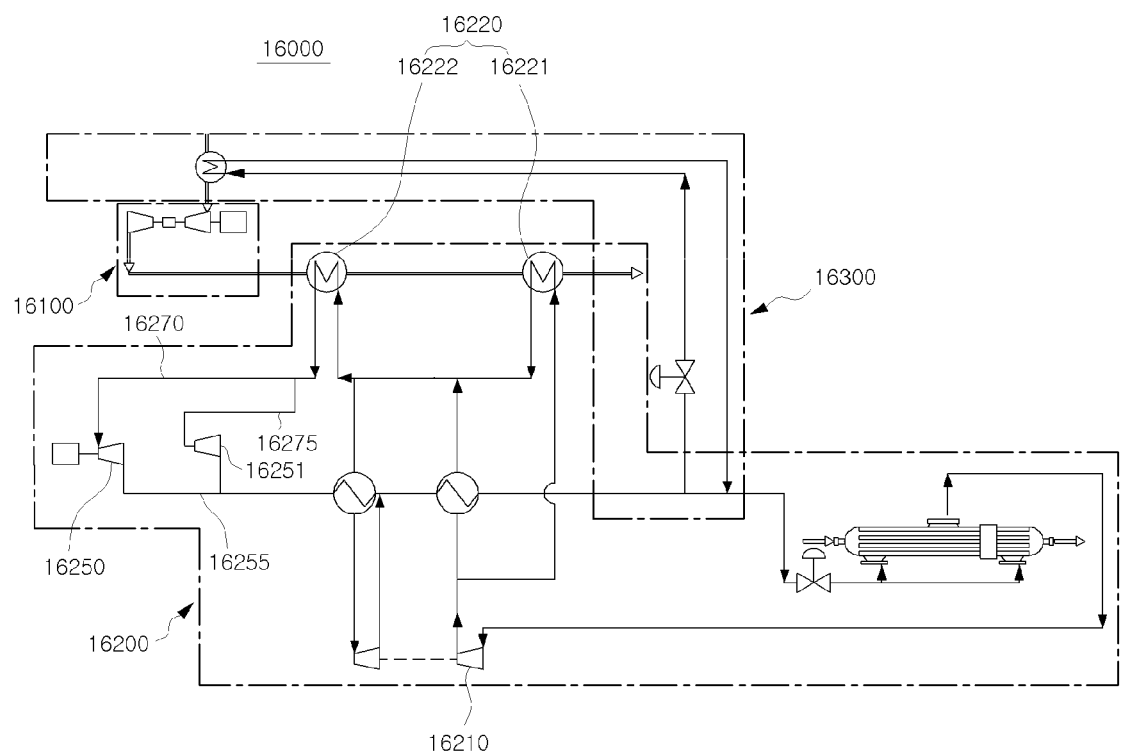
[FIG 17]

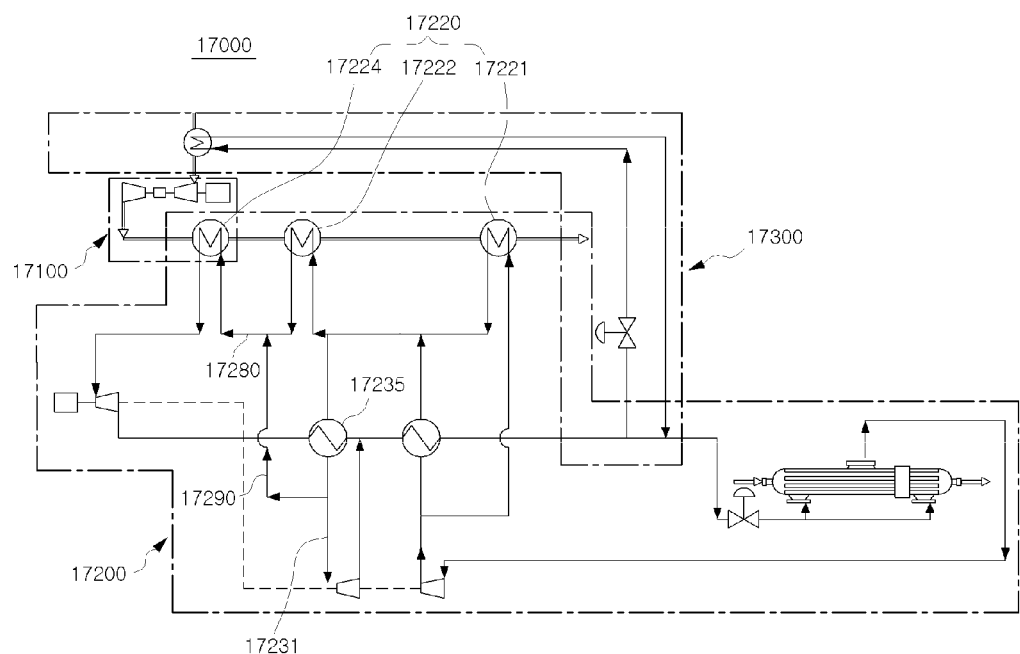
[FIG 18]

COMBINED CYCLE POWER PLANT

CROSS REFERENCE TO RELATED APPLICATION

The present application claims priority to Korean Patent Application No. 10-2017-0064743, filed May 25, 2017 and Korean Patent Application No. 10-2017-0078498, filed Jun. 21, 2017, the entire contents of which is incorporated herein for all purposes by this reference.

BACKGROUND OF THE INVENTION

Field of the Invention

The present invention relates generally to a combined cycle power plant and, more particularly, to a combined cycle power plant equipped with an improved cooling structure that cools air supplied to a gas turbine power generation system, thereby exhibiting improved operating performance in terms of power output and power generation efficiency thereof.

Description of the Related Art

Generally, a combined cycle power plant using a gas turbine refers to a combined form of a gas turbine power plant that produces electricity using a gas turbine and a steam turbine power plant that produces electricity using waste heat of hot exhaust gases discharged from the gas turbine power plant.

A gas turbine used in a gas turbine power plant generates rotary power by burning a mixture of fuel and compressed air which is compressed by a compressor, and produces electricity using the rotary power. To improve efficiency of such a gas turbine, a technique of lowering the temperature of external air supplied to the compressor has been proposed.

For example, referring to Japanese Patent No. 4166822, antifreeze is circulated through an air inlet portion of a gas turbine to cool intake air supplied to the gas turbine to improve the efficiency of the gas turbine.

However, since the technique of cooling the intake air supplied to the gas turbine used in a conventional combined cycle power plant requires a separate cooling system for circulating the antifreeze to cool the intake air supplied the gas turbine, the structure of the plant is complicated and the cost is increased.

The foregoing is intended merely to aid in the understanding of the background of the present invention, and is not intended to mean that the present invention falls within the purview of the related art that is already known to those skilled in the art.

SUMMARY OF THE INVENTION

Accordingly, the present invention has been made keeping in mind the above problems occurring in the related art, and an object of the present invention is to provide a combined cycle power plant using a gas turbine, the plant being capable of improving power output and efficiency by cooling intake air supplied to a gas turbine by using an operating fluid of a power generation system that uses waste heat of a gas turbine.

In order to accomplish the above object, according to one aspect of the invention, there is provided a combined cycle power plant including a gas turbine power generation system discharging a combustion gas; an operating fluid power generation system for heating an operating fluid using the discharged combustion gas and for generating electricity by using the operating fluid; and a cooling system for supplying the operating fluid to an upstream side of the gas turbine power generation system and for cooling air to be introduced into the gas turbine power generation system. The gas turbine power generation system may include an air compressor for compressing air supplied to the gas turbine power generation system through an air incoming path, a gas turbine for generating rotary power by burning a mixture of fuel and the compressed air, and a first generator for generating electricity using the rotary power of the gas turbine. The cooled air may be introduced into the gas turbine power generation system through the air incoming path.

According to another aspect of the invention, a combined cycle power plant may include a gas turbine power generation system discharging a combustion gas, an operating fluid power generation system, and a gas turbine air cooling system. The operating fluid power generation system may include a heat exchange unit for heating an operating fluid using the discharged combustion gas; a compressor for compressing the operating fluid and for supplying the compressed operating fluid to the heat exchange unit; a recuperator arranged between the compressor and the heat exchange unit and configured to heat the operating fluid supplied from the compressor and to supply the heated operating fluid to the heat exchange unit; an operating fluid supply line connected between the compressor and the recuperator to transport the operating fluid from the compressor to the recuperator; a first transport line connected between the heat exchange unit and the recuperator to transport the operating fluid passing through the recuperator to the heat exchange unit; an operating fluid turbine for generating electric power by using the operating fluid passing through the heat exchange unit; a return line connected between the operating fluid turbine and the compressor; and a condenser provided on the return line and configured to cool the operating fluid supplied to the compressor. The gas turbine air cooling system may include a cooler arranged at an upstream side of the gas turbine power generation system to cool air supplied to the gas turbine power generation system, by using the operating fluid supplied through an introduction line that branches off from the operating fluid supply line, wherein the operating fluid passing through the cooler is transported to the heat exchange unit via a recovery line.

The heat exchange unit may include a first heat exchanger that heats the operating fluid by performing heat exchange between the operating fluid introduced through the recovery line and the discharged combustion gas, a second heat exchanger that heats the operating fluid passing through the first heat exchanger and the operating fluid supplied from the compressor by using the discharged combustion gas, and a second transport line connected between the first heat exchanger and the first transport line.

The condenser may include a cooling body having an operating fluid inlet through which the operating fluid is introduced at a first portion thereof and an operating fluid outlet through which the operating fluid is discharged at a second portion thereof; an LNG introduction line connected to a first end of the cooling body such that liquid natural gas (LNG) is introduced into the cooling body through the LNG introduction line; and an LNG discharge line connected to a second end of the cooling body such that the LNG circulated through the cooling body is discharged from the cooling body through the LNG discharge line. The condenser may further include a vaporizer provided on one side of the cooling body and configured to vaporize the LNG by performing heat exchange between the LNG passing through the cooling body and the water, wherein the water is sea water. The operating fluid may be carbon dioxide, and the condenser may cool and condense the operating fluid using cold energy of the LNG.

The combined cycle power plant may further include an inflow control valve to control a flow of the operating fluid flowing through the introduction line. The gas turbine air cooling system may include a temperature sensor that measures a temperature of the air supplied to the gas turbine power generation system, and a controller that controls the inflow control valve according to the measured temperature. The temperature sensor may include a first temperature sensor arranged at an upstream side of the cooler and a second temperature sensor arranged at a downstream side of the cooler, and the controller may control the inflow control valve according to a temperature of the air measured by the first temperature sensor and a temperature of the air measured by the second temperature sensor.

The combined cycle power plant may further include a fourth transport line connected between the heat exchange unit and the operating fluid turbine, to transport the operating fluid discharged from the heat exchange unit to the operating fluid turbine; a fifth transport line that branches off from the fourth transport line and connects to the return line at a first end thereof; and an auxiliary turbine provided on the fifth transport line and configured to generate driving power by using the operating fluid transported through the fifth transport line.

According to another aspect of the invention, a combined cycle power plant may include a gas turbine power generation system discharging a combustion gas, an operating fluid power generation system, and a gas turbine air cooling system. The operating fluid power generation system may include a heat exchange unit for heating an operating fluid using the discharged combustion gas; a compressor for compressing the operating fluid and for supplying the compressed operating fluid to the heat exchange unit; a recuperator arranged at an upstream side of the heat exchange unit and configured to preheat the operating fluid supplied to the heat exchange unit and to supply the heated operating fluid to the heat exchange unit; a first transport line connected between the heat exchange unit and the recuperator to transport the operating fluid passing through the recuperator to the heat exchange unit; an operating fluid turbine for generating electricity using the operating fluid passing through the heat exchange unit; a return line connected between the operating fluid turbine and the compressor; and a condenser provided on the return line and configured to cool the operating fluid supplied to the compressor. The gas turbine air cooling system may include a cooler arranged at an upstream side of the gas turbine power generation system and configured to cool air supplied to the gas turbine power generation system, by using the operating fluid supplied through an introduction line that transports the operating fluid from the compressor to the recuperator, wherein the operating fluid passing through the cooler is transported to the heat exchange unit via a recovery line and the recuperator. Here, the combined cycle power plant may further include a fourth transport line connected between the heat exchange unit and an operating fluid turbine of the operating fluid power generation system, to transport the operating fluid discharged from the heat exchange unit to the operating fluid turbine; a fifth transport line that branches off from the fourth transport line and connects to the return line at a first end thereof; and an auxiliary turbine provided on the fifth transport line and configured to generate driving power by using the operating fluid transported through the fifth transport line.

According to another aspect of the invention, the gas turbine power generation system of the combined cycle power plant may include an air compressor for compressing air supplied through an air incoming path; a gas turbine for generating rotary power by burning a mixture of fuel and air that is compressed by the air compressor; and a first generator for generating electricity using the rotary power of the gas turbine. The operating fluid power generation system of the combined cycle power plant may include a heat exchange unit for heating an operating fluid using a combustion gas discharged from the gas turbine; a compressor for compressing the operating fluid and for supplying the compressed operating fluid to the heat exchange unit; a first recuperator provided between the compressor and the heat exchange unit to heat the operating fluid supplied from the compressor and to supply the heated operating fluid to the heat exchange unit; an operating fluid supply line connected to the compressor at a first end thereof and connected to the first recuperator at a second end thereof to transport the operating fluid from the compressor to the first recuperator; a first transport line connected to the heat exchange unit at a first end thereof and connected to the first recuperator at a second end thereof to transport the operating fluid passing through the first recuperator to the heat exchange unit; an operating fluid turbine for generating electricity using the operating fluid passing through the heat exchange unit; a return line connected to the operating fluid turbine at a first end thereof and connected to the compressor at a second end thereof; and a condenser provided on the return line and configured to cool the operating fluid to be supplied to the compressor. The gas turbine air cooling system of the combined cycle power plant may include an introduction line that branches off from the operating fluid supply line and connects to an upstream side of the air compressor at a first end thereof to supply the operating fluid to the upstream side of the air compressor; a cooler arranged on the upstream side of the air compressor to cool air to be supplied to the air compressor by using the operating fluid supplied through the introduction line; and a recovery line that transports the operating fluid passing through the cooler to the heat exchange unit. The heat exchange unit may include a first heat exchanger for heating the operating fluid by performing heat exchange between the operating fluid introduced through the recovery line and a combustion gas discharged from the gas turbine, a second heat exchanger for heating the operating fluid passing through the first heat exchanger and the operating fluid supplied from the compressor by using the combustion gas discharged from the gas turbine, a second transport line connected to the first heat exchanger at a first end thereof and connected to the first transport line at a second end thereof, a sixth transport line connected to the first transport line at a first end thereof and connected to the return line at a second end thereof, and a second recuperator provided on the sixth transport line to perform heat exchange between the operating fluid transported through the sixth transport line and the operating fluid transported through the return line. Here, the combined cycle power plant may further include an auxiliary pump provided on the sixth transport line to pressurize and transport the operating fluid flowing through the sixth transport line.

According to another aspect of the invention, the heat exchange unit may include a first heat exchanger for heating the operating fluid by performing heat exchange between the operating fluid introduced through the recovery line and a combustion gas discharged from the gas turbine, a second heat exchanger for heating the operating fluid passing through the first heat exchanger and the operating fluid supplied from the compressor by using the combustion gas discharged from the gas turbine, a third heat exchanger for heating the operating fluid passing through the second heat exchanger by using the combustion gas discharged of the gas turbine, a second transport line connected to the first heat exchanger at a first end thereof and connected to the first transport line at a second end thereof, a seventh transport line connected to the second heat exchanger at a first end thereof and connected to the third heat exchanger at a second end thereof, a sixth transport line connected to the first transport line at a first end thereof and connected to a return line at a second end thereof, a second recuperator provided on the sixth transport line to perform heat exchange between the operating fluid transported through the sixth transport line and the operating fluid transported through the return line, and an eighth transport line connected to the seventh transport line at a first end thereof and connected to the sixth transport line connected to a downstream side of the second recuperator at a second end thereof.

According to another aspect of the invention, the operating fluid power generation system of the combined cycle power plant may include a heat exchange unit for heating an operating fluid using a combustion gas discharged from the gas turbine; a compressor for compressing the operating fluid and for supplying the compressed operating fluid to the heat exchange unit; a recuperator arranged between the compressor and the heat exchange unit, heating the operating fluid supplied from the compressor, and supplying the heated operating fluid to the heat exchange unit; an operating fluid supply line connected to the compressor at a first end thereof and connected to the recuperator at a second end thereof to transport the operating fluid from the compressor to the recuperator; a first transport line connected to the heat exchange unit at a first end thereof and connected to the recuperator at a second end thereof to supply the operating fluid passing through the recuperator to the heat exchange unit; an operating fluid turbine for generating electricity using the operating fluid passing through the heat exchange unit; a return line connected to the operating fluid turbine at a first end thereof and connected to the compressor at a second end thereof; and a condenser provided on the return line and cooling the operating fluid supplied to the compressor. The gas turbine air cooling system of the combined cycle power plant may include an introduction line that branches off from the return line and connects to an upstream side of the air compressor at a first end thereof to supply the operating fluid to the upstream side of the air compressor, a cooler arranged at the upstream side of the air compressor and cooling air supplied to the air compressor by using the operating fluid supplied through the introduction line, and a recovery line for transporting the operating fluid passing through the cooler to the return line. Here, the combined cycle power plant may further include a second transport line that branches off from the operating fluid supply line, and the heat exchange unit may include a first heat exchanger for heating the operating fluid by performing heat exchange between the operating fluid introduced through the second transport line and the combustion gas discharged from the gas turbine; a second heat exchanger for heating the operating fluid passing through the first heat exchanger and the operating fluid supplied from the compressor by using the combustion gas discharged from the gas turbine; and a third transport line connected to the first heat exchanger at a first end thereof and connected to the first transport line at a second end thereof. The combined cycle power plant may also further include an inflow control valve provided on the introduction line to control a flow of the operating fluid flowing through the introduction line, and the gas turbine air cooling system may include a temperature sensor for measuring a temperature of air flowing through the air incoming path and a controller for controlling opening and closing of the inflow control valve according to a temperature measured by the temperature sensor.

According to another aspect of the invention, there is provided a combined cycle power plant comprising: a gas turbine power generation system including an air compressor for compressing air supplied through an air incoming path, a gas turbine for generating rotary power by burning a mixture of fuel and air compressed by the air compressor, and a first generator for generating electricity by using the rotary power of the gas turbine; an operating fluid power generation system including a heat exchange unit for heating an operating fluid by using a combustion gas discharged from the gas turbine, a compressor for compressing the operating fluid and for supplying the compressed operating fluid to the heat exchange unit, a first recuperator arranged between the compressor and the heat exchange unit, heating the operating fluid supplied from the compressor, and supplying the heated operating fluid to the heat exchange unit, an operating fluid supply line connected to the compressor at a first end thereof and connected to the first recuperator at a second end thereof to transport the operating fluid from the compressor to the first recuperator, a first transport line connected to the heat exchange unit at a first end thereof and connected to the first recuperator at a second end thereof to supply the operating fluid passing through the first recuperator to the heat exchange unit, an operating fluid turbine for generating electric power using the operating fluid passing through the heat exchange unit, a return line connected to the operating fluid turbine at a first end thereof and connected to the compressor at a second end thereof, and a condenser provided on the return line and cooling and condensing the operating fluid supplied to the compressor; a gas turbine cooling system including an introduction line that branches off from the return line and connected to an upstream side of the air compressor at a first end thereof to supply the operating fluid to the upstream side of the air compressor, a cooler arranged at the upstream side of the air compressor to cool air supplied to the air compressor by using the operating fluid supplied through the introduction line, and a recovery line for transporting the operating fluid passing through the cooler to the return line; and a second transport line that branches off from the operating fluid supply line, wherein the heat exchange unit includes a first heat exchanger for heating the operating fluid by performing heat exchange between the operating fluid introduced through the second transport line and a combustion gas discharged from the gas turbine, a second heat exchanger for heating the operating fluid passing through the first heat exchanger and the operating fluid supplied from the compressor by using the combustion gas discharged from the gas turbine, and a third transport line connected to the first heat exchanger at a first end thereof and connected to the first transport line at a second end thereof, a sixth transport line connected to the third transport line at a first end thereof and connected to a return line at a second end thereof, and a second recuperator provided on the sixth transport line and performing heat exchange between the operating fluid transported through the sixth transport line and the operating fluid transported through the return line.

According to another aspect of the invention, there is provided a combined cycle power plant comprising: a gas turbine power generation system including an air compressor for compressing air supplied through an air incoming path, a gas turbine for generating rotary power by burning a mixture of fuel and air compressed by the air compressor, and a first generator for generating electricity by using the rotary power of the gas turbine; an operating fluid power generation system including a heat exchange unit for heating an operating fluid using a combustion gas discharged from the gas turbine, a compressor for compressing the operating fluid and for supplying the compressed operating fluid to the heat exchange unit, a first recuperator arranged between the compressor and the heat exchange unit, heating the operating fluid supplied from the compressor, and supplying the heated operating fluid to the heat exchange unit, an operating fluid supply line connected to the compressor at a first end thereof and connected to the first recuperator at a second end thereof to transport the operating fluid from the compressor to the first recuperator, a first transport line connected to the heat exchange unit at a first end thereof and the first recuperator at a second end thereof to supply the operating fluid passing through the first recuperator to the heat exchange unit, an operating fluid turbine for generating electric power by using the operating fluid passing through the heat exchange unit, a return line connected to the operating fluid turbine at a first end thereof and connected to the compressor at a second end thereof, and a condenser provided on the return line and cooling and condensing the operating fluid supplied to the compressor; a gas turbine air cooling system including an introduction line that branches off from the return line and connects to an upstream side of the air compressor at a first end thereof to supply the operating fluid to the upstream side of the air compressor, a cooler arranged at the upstream side of the air compressor to cool air supplied to the air compressor by using the operating fluid supplied through the introduction line, and a recovery line for transporting the operating fluid passing through the cooler to the return line; and a second transport line that branches off from the operating fluid supply line, wherein the heat exchange unit includes a first heat exchanger for heating the operating fluid by performing heat exchange between the operating fluid introduced through the second transport line and the combustion gas discharged from the gas turbine, a second heat exchanger for heating the operating fluid passing through the first heat exchanger and the operating fluid supplied from the compressor by using the combustion gas discharged from the gas turbine, a third transport line connected to the first heat exchanger at a first end thereof and connected to the first transport line at a second end thereof, a sixth transport line connected to the third transport line at a first end thereof and connected to a return line at a second end thereof, and a second recuperator provided on the sixth transport line and performing heat exchange between the operating fluid transported through the sixth transport line and the operating fluid transported through the return line, a third heat exchanger for heating the operating fluid passing through the second heat exchanger using the combustion gas discharged from the gas turbine, a seventh transport line connected to the second heat exchanger at a first end thereof and connected to the third heat exchanger at a second end thereof, and an eighth transport line connected to the seventh transport line at a first end thereof and connected to the sixth transport line provided at a downstream side of the second recuperator at a second end thereof.

As described above, according to the present invention, the combined cycle power plant can improve power output and power generation efficiency by using an operating fluid used in a power generation system that uses waste heat of a gas turbine.

In addition, according to the present invention, the combined cycle power plant may exhibit improved power output regardless of the temperature of external air.

BRIEF DESCRIPTION OF THE DRAWINGS

The above and other objects, features and other advantages of the present invention will be more clearly understood from the following detailed description when taken in conjunction with the accompanying drawings, in which:

FIGS. 1-18 are conceptual diagrams of a combined cycle power plant according to first to eighteenth embodiments of the present invention, respectively.

DETAILED DESCRIPTION OF THE INVENTION

Herein, preferred embodiments of the present invention will be described in detail with reference to the accompanying drawings. Further, it should be noted that the terms and words used in the specification and the claims should not be construed as being limited to ordinary meanings or dictionary definitions, but should be interpreted as having meanings that are consistent with their meanings in the context of the relevant art and the technical spirit of the present invention based on the principle that the inventors can appropriately define the terms to best describe their invention.

Referring to FIG. 1, according to a first embodiment of the present invention, a combined cycle power plant 1 includes a gas turbine power generation system 100 discharging a combustion gas G, an operating fluid power generation system 200, and a gas turbine air cooling system 300. The gas turbine power generation system 100 is provided with external air through an air incoming path 111 and produces electricity using a gas turbine.

The gas turbine power generation system 100 typically includes an air compressor 110, a gas turbine 120, and a first generator 130. The air compressor 110 compresses external air introduced through the air incoming path 111 at a high pressure and supplies the compressed external air to the gas turbine 120. The gas turbine 120 burns a mixture of fuel and compressed air, thereby generating rotary power. The first generator 130 receives the rotary power generated by the gas turbine and produces electricity using the rotary power.

The combustion gas G discharged from the gas turbine 120 may be sent to the operating fluid power generation system 200.

The operating fluid power generation system 200 includes a compressor 210, a heat exchange unit 220, a recuperator 230, an operating fluid supply line 240, a first transport line 245, an operating fluid turbine 250, a return line 255, and a condenser 260.

The heat exchange unit 220 increases the temperature of the operating fluid by performing heat exchange between the hot combustion gas G passing through the gas turbine 120 and the operating fluid.

The heat exchange unit 220 includes a first heat exchanger 221, a second heat exchanger 222, and a second transport line 223.

The first heat exchanger 221 and the second heat exchanger 222 are arranged to be close to each other such that the combustion gas G discharged from the gas turbine sequentially passes the first and second heat exchangers 221 and 222.

A first end of the second transport line 223 is connected to the first heat exchanger 221 and a second end of the second transport line 223 is connected to the first transport line 245 that transports the operating fluid from the recuperator 230 to the second heat exchanger 222.

The first heat exchanger 221 is connected to a recovery line 330 extending from a cooler 320 provided at an introduction side of the air compressor 110, thereby heating the operating fluid by performing heat exchange between the operating fluid introduced through the recovery line 330 and the combustion gas G discharged from the gas turbine 120. The operating fluid passing through the first heat exchanger 221 is mixed with the operating fluid supplied through the first transport line, and then transported to the second heat exchanger 222. The second heat exchanger 222 further heats the operating fluid by performing heat exchange between the mixed operating fluid and the combustion gas discharged from the gas turbine 120.

The compressor 210 compresses the operating fluid and transports the compressed operating fluid. In the present embodiment, the operating fluid is carbon dioxide. Although carbon dioxide is used as the operating fluid in the present embodiment, the operating fluid is not limited thereto. That is, a different material can be used as the operating fluid if the material can be used to implement a power cycle and to cool external air. The operating fluid compressed by the compressor 210 is then supplied to the heat exchange unit 220.

The recuperator 230 is arranged between the compressor 210 and the heat exchange unit 220, which is the upstream side of the heat exchange unit 220. The compressor 210 and the recuperator 230 are connected by the operating fluid supply line 240. The operating fluid supply line 240 is a pipeline connected to the recuperator 230 at a first end thereof and connected to the compressor 210 at a second end thereof.

The recuperator 230 and the second heat exchanger of the heat exchange unit 220 are connected by the first transport line 245. The first transport line 245 is connected to the second heat exchanger 222 of the heat exchange unit 220 at a first end thereof and connected to the recuperator 230 at a second end thereof.

The recuperator 230 heats, or preheats, the operating fluid that is discharged from the compressor 210 and is supplied thereto through the operating fluid supply line 240, and supplies the heated operating fluid to the second heat exchanger 222 of the heat exchange unit 220 through the first transport line 245.

The downstream side (toward the left in FIG. 1) of the heat exchange unit 220 is provided with the operating fluid turbine 250. The operating fluid turbine 250 receives the operating fluid passing through the second heat exchanger 222 of the heat exchange unit 220, thereby generates rotary driving power using the operating fluid and producing electricity using the rotary driving power. The operating fluid turbine is equipped with a second generator 251 to generate electricity.

The return line 255 is provided between the operating fluid turbine 250 and the compressor 210, and transports the operating fluid discharged from the operating fluid turbine 250 to the compressor 210. A first end of the return line 255 is connected to an outlet side of the operating fluid turbine 250, and a second end of the return line 255 is connected to an inlet side of the compressor 210.

The return line 255 is formed to extend through the recuperator 230 and increases the temperature of the operating fluid supplied from the compressor by allowing heat exchange between the operating fluid flowing through the return line 255 and the operating fluid introduced from the compressor 210.

The operating fluid passing through the recuperator 230 is transported to the condenser 260 via the return line 255. The condenser 260 is provided on the return line 255, thereby cooling and condensing the operating fluid flowing through the return line 255.

The condenser 260 includes a cooling body 261, a liquid natural gas (LNG) introduction pipe 262, and an LNG discharge pipe 263.

A first side (lower side in FIG. 1) of the cooling body 261 is provided an operating fluid inlet 261a through which the operating fluid supplied through the return line 255 can be introduced into the cooling body 261, and a second side (upper side in FIG. 1) of the cooling body 261 is provided with an operating fluid outlet 261b through the operating fluid is discharged from the cooling body 261.

A first end (toward the left in FIG. 1) of the cooling body 261 is connected to an LNG introduction pipe 262 through which LNG is introduced into the cooling body 261, and a second end (toward the right in FIG. 1) of the cooling body 261 is connected to an LNG discharge pipe 263 through which the LNG is discharged from the cooling body.

The LNG externally supplied to the cooling body through the LNG introduction pipe 262 functions to cool and condense the operating fluid flowing through the return line 255, and is then discharged from the cooling body through the LNG discharge pipe 263. A vaporizer 264 is provided at a second side of the cooling body 261. A first end of the vaporizer 264 connects to a sea water introduction pipe 265 through which sea water is introduced and a second end of the vaporizer 264 connects to a sea water discharge pipe 266 through which sea water is discharged. The LNG discharged from the cooling body through the LNG discharge pipe 263 performs heat exchange with the sea water introduced through the sea water introduction pipe 265, thereby turning into a gas phase by the vaporizer 264.

The gas turbine air cooling system 300 is provided between the gas turbine power generation system 100 and the operating fluid power generation system 200.

The gas turbine air cooling system 300 includes an introduction line 310, a cooler 320, a recovery line 330, a temperature sensor 340, and a controller 350.

The cooler 320 is provided on the air incoming path 111 arranged at an upstream side of the air compressor 110 of the gas turbine power generation system 100, or, in other words, at the upstream side of the turbine power generation system 100 itself. The introduction line 310 branches off from the operating fluid supply line 240 and is connect to the cooler 320 at a first end thereof, thereby supplying the operating fluid to the cooler 320. The introduction line 310 is provided with an inflow control valve 311 that controls the flow of the operating fluid that flows through the introduction line 310.

The cooler 320 lowers the temperature of the external air by performing heat exchange between the operating fluid supplied through the introduction line 310 and the external air introduced through the air incoming path 111. The cooled external air is supplied to the air compressor 110. In this way, by lowering the temperature of the external air introduced into the air compressor 110 of the gas turbine power generation system 100, it is possible to improve power output and efficiency of the gas turbine power generation system 200.

The recovery line 330 is provided between the cooler 320 and the heat exchange unit 220. That is, a first end of the recovery line 330 is connected to the cooler 320 and a second end of the recovery line 330 is connected to the first heat exchanger 221 of the heat exchange unit 220. The operating fluid passing through the cooler 320 is transported to the first heat exchanger 221 through the recovery line 330.

The air incoming path 111 is provided with a temperature sensor 340 to measure the temperature of the air flowing through the air incoming path 111. The temperature sensor 340 includes a first temperature sensor 341 and a second temperature sensor 342.

The first temperature sensor 341 is provided on the air incoming path provided at an upstream side of the cooler 320, thereby measuring the temperature of the air introduced into the cooler 320. The second temperature sensor 342 is provided on the air incoming path provided at a downstream side of the cooler 320, thereby measuring the temperature of the air passing through the cooler.

The controller 350 controls opening and closing of the inflow control valve 311 according to the temperature of the air measured by the temperature sensor 340, thereby controlling the flow of the operating fluid through the introduction line 310. The controller 350 controls the flow rate of the operating fluid of the introduction line 310 according to the temperatures of air measured by the first temperature sensor 341 and the second temperature sensor 342, thereby controlling the temperature of air supplied to the air compressor 110 through the air incoming path 111.

As described above, the combined cycle power plant 1 according to a first embodiment of the present invention not only improves power output and efficiency of the gas turbine power generation system 100 by lowering the temperature of air supplied to the air compressor 110 of the gas turbine power generation system 100 but also improves the efficiency of the operating fluid power generation system 200 by absorbing heat of the external air by using the operating fluid.

Furthermore, the combined cycle power plant 1 according to the first embodiment of the present invention uses a portion of the operating fluid discharged from the compressor 210 to lower the temperature of the air supplied to the air compressor 110, and then sends the operating fluid to the heat exchange unit 220, thereby increasing the overall heat absorption amount, which results in increase in the power output. In addition, since the combined cycle power plant 1 according to the first embodiment of the present invention uses a high pressure pipe for transporting a highly pressurized operating fluid discharged from the compressor, it is possible to reduce the size of the pipe, resulting in a cost reduction effect. Furthermore, since an additional cooling cycle for lowering the temperature of air supplied to the air compressor 110 of the gas turbine power generation system 100 is not required, the cost reduction effect is improved.

Furthermore, since the combined cycle power plant according to the first embodiment of the present invention cools and condenses carbon dioxide serving as the operating fluid by using waste cold energy of liquid natural gas (LNG), performs power generation by using the cooled and condensed carbon dioxide, and cools the air supplied to the gas turbine power generation system 200, the overall power output and the overall power generation efficiency of the combined cycle power plant can be improved.

FIG. 2 shows a combined cycle power plant 1000 according to a second embodiment of the present invention.

Referring to FIG. 2, the combined cycle power plant 1000 includes a gas turbine power generation system 1100, an operating fluid power generation system 1200, and a cooling system 1300.

The combined cycle power plant 1000 has a structure configured by adding a third transport line 1224, serving as a bypass line for sending a portion of the operating fluid supplied to the introduction line to a recovery line 1330, to the structure of the combined cycle power plant 1 according to the first embodiment. Thus, among the components of the combined cycle power plant 1000, description about the same components as those in the first embodiment will be omitted, and only the added component will be described.

The third transport line 1224 is connected to the introduction line 1310 at a first end thereof and connected to the recovery line 1330 at a second end thereof. A portion of the operating fluid supplied from the compressor 1210 is transported to the cooler 1320 through the introduction line 1310, and the remaining portion of the operating fluid is transported to the recovery line 1330 through the third transport line 1224.

When the amount of the operating fluid required by the cooler 1320 is smaller than the amount of the operating fluid introduced through the introduction line 1310, a portion of the operating fluid is directly sent to the recovery line 1330 through the third transport line 1224, and the operating fluid that is transported through the third transport line 1224 is then mixed with the operating fluid transported to the recovery line 1330. Afterwards, the mixture of the operating fluids is transported to the first heat exchanger 1221 so as to be heated there.

FIG. 3 shows a combined cycle power plant 2000 according to a third embodiment of the present invention.

Referring to FIG. 3, the combined cycle power plant 2000 includes a gas turbine power generation system 2100, an operating fluid power generation system 2200, and a cooling system 2300.

The combined cycle power plant 2000 has a structure configured by adding a fourth transport line 2270, a fifth transport line 2275, and an auxiliary turbine 2251 to the structure of the combined cycle power plant 1 according to the first embodiment. Thus, among the components of the combined cycle power plant 2000, description about the same components as those in the first embodiment will be omitted, and only the added components will be described.

The fourth transport line 2270 is provided between the heat exchange unit 2220 and the operating fluid turbine 2250, thereby transporting the operating fluid discharged from the heat exchange unit 2220 to the operating fluid turbine 2250. A first end of the fourth transport line 2270 is connected to the second heat exchanger 2222 of the heat exchange unit 2220 and a second end thereof is connected to the operating fluid turbine 2250.

The fifth transport line 2275 branches off from the fourth transport line 2270. A first end of the fifth transport line 2275 is connected to the return line 2255 and the fifth transport line 2275 is connected to the auxiliary turbine 2251.

The fifth transport line 2275 transports a portion of the operating fluid introduced through the fourth transport line 2270 and supplies it to the auxiliary turbine 2251. The auxiliary turbine 2251 generates rotary driving power using the operating fluid transported through the fifth transport line 2275, and supplies the rotary driving power to the compressor 2210 to drive the compressor 2210.

FIG. 4 shows a combined cycle power plant 3000 according to a fourth embodiment of the present invention.

Referring to FIG. 4, the combined cycle power plant 3000 includes a gas turbine power generation system 3100, an operating fluid power generation system 3200, and a cooling system 3300.

The combined cycle power plant 3000 has a structure configured by adding a third transport line 3224, via which a portion of the operating fluid supplied through the introduction line is sent to a return line, to the structure of the combined cycle power plant 2000 according to the third embodiment. Thus, among the components of the combined cycle power plant 3000, description about the same components as those in the third embodiment will be omitted, and only the added component will be described.

The third transport line 3224 is connected to the introduction line 3310 at a first end thereof and connected to the recovery line 3330 at a second end thereof. A portion of the operating fluid supplied from a compressor 3210 is transported to a cooler 3320 through an introduction line 3310, and a portion of the operating fluid is transported to a recovery line 3330 through the third transport line 3224.

FIG. 5 shows a combined cycle power plant 4000 according to a fifth embodiment of the present invention.

Referring to FIG. 5, the combined cycle power plant 4000 includes a gas turbine power generation system 4100, an operating fluid power generation system 4200, and a cooling system 4300.

The combined cycle power plant 4000 is configured by modifying the first embodiment. Thus, among the components of the combined cycle power plant 4000, description about the same components as those in the first embodiment will be omitted and, only the different structure from the first embodiment, namely, the structure in which the operating fluid is supplied to the cooler of the gas turbine air cooling system, will be described.

Referring to FIG. 5, the combined cycle power plant 4000 includes an introduction line 4310 through which the operating fluid is supplied to the cooler of the gas turbine air cooling system, a cooler 4320, and a recovery line 4330.

The introduction line 4310 is provided between a compressor 4210 and the cooler 4320, thereby supplying the operating fluid discharged from the compressor 4310 to the cooler 4320. The introduction line 4310 is connected to the compressor 4210 at a first end thereof and connected to the cooler 4320 arranged at an upstream side of the air compressor 4210 at a second end thereof.

The recovery line 4330 is arranged between the cooler 4320 and a heat exchange unit 4220. The recovery line 4330 is connected to the cooler 4320 at a first end thereof and connected to the heat exchange unit 4220 at a second end thereof, thereby transporting the operating fluid passing through the cooler 4320 to the heat exchange unit 4220.

A recuperator 4230 is provided on the recovery line 4330. The recuperator 4230 is configured such that a return line 4255 extends through the recuperator 4230. The operating fluid supplied to the recuperator 4230 through the recovery line 4330 performs heat exchange with the operating fluid transported through the return line 4255, so that the temperature of the operating fluid supplied to the recuperator 4230 is increased and the heated operating fluid is then transported to the heat exchange unit 4220 through the recovery line 4330.

In the combined cycle power plant 4000 according to the fifth embodiment of the present invention, the entire amount of the operating fluid discharged from the compressor 4210 is supplied to the cooler 4320 of the gas turbine air cooling system. Therefore, the air taken into the gas turbine power generation system 4100 can be effectively cooled down, and the overall heat absorption amount of the operating fluid can be increased. Therefore, the power output of the combined cycle power plant can be increased.

FIG. 6 shows a combined cycle power plant 5000 according to a sixth embodiment of the present invention.

Referring to FIG. 6, the combined cycle power plant 5000 includes a gas turbine power generation system 5100, an operating fluid power generation system 5200, and a cooling system 5300.

The combined cycle power plant 5000 has a structure configured by adding a fourth transport line 5270, a fifth transport line 5275, and an auxiliary turbine 5251 to the structure of the combined cycle power plant 4000 according to the fifth embodiment. Thus, among the components of the combined cycle power plant 5000, description about the same components as those in the fifth embodiment will be omitted, and only the added components will be described.

The fourth transport line 5270 is provided between a heat exchange unit 5220 and an operating fluid turbine 5250, thereby transporting the operating fluid discharged toward the heat exchange unit 5220 to the operating fluid turbine 5250. The fourth transport line 5270 is connected to a second heat exchanger 5222 of the heat exchange unit 5220 at a first end thereof and connected to the operating fluid turbine 5250 at a second end thereof.

The fifth transport line 5275 branches off from the fourth transport line 5270. The fifth transport line is connected to the return line 5255, and the fifth transport line 5275 is connected to the auxiliary turbine 5251.

The fifth transport line 5275 transport a portion of the operating fluid introduced through the fourth transport line 5270 and supplies it to the auxiliary turbine 5251. The auxiliary turbine 5251 generates rotary driving power using the operating fluid transported through the fifth transport line 5275, and drives the compressor 5210 by transferring the rotary driving power to the compressor 5210.

FIG. 7 shows a combined cycle power plant 6000 according to a seventh embodiment of the present invention.

Referring to FIG. 7, the combined cycle power plant 6000 includes a gas turbine power generation system 6100, an operating fluid power generation system 6200, and a cooling system 6300.

The combined cycle power plant 6000 has a structure configured by adding a sixth transport line 6231 and a second recuperator 6235 to the structure of the combined cycle power plant 1 according to the first embodiment. Thus, among the components of the combined cycle power plant 6000, description about the same components as those in the first embodiment will be omitted, and only the added components will be described.

The sixth transport line 6231 is connected to the second transport line 6223 at a first end thereof and connected to the return line 6255 at a second end thereof, thereby transporting a portion of the operating fluid introduced through the second transport line 6223 to the return line 6255. The sixth transport line 6231 is provided with the second recuperator 6235.

The return line 6255 is configured to extend through the second recuperator 6235, thereby allowing heat exchange between the operating fluid introduced through the return line 6255 and the operating fluid introduced through the sixth transport line 6231 to be performed in the second recuperator 6235. Therefore, the temperature of the operating fluid introduced through the return line 6255 is lowered. The operating fluid that is cooled to a lower temperature in the second recuperator 6235 is mixed with the operating fluid transported through the sixth transport line 6231, and the mixture of the operating fluids is transported to the first recuperator 6230. The operating fluid transported to the first recuperator 6230 is cooled further in the first recuperator 6203 by being mixed with the operating fluid discharged from the compressor 6210. That is, the operating fluid transported through the return line 6255 is cooled sequentially by the first and second recuperators 6210 and 6231. Therefore, the cooling efficiency is improved.

The sixth transport line 6231 may be provided with an auxiliary pump 6236 so that the operating fluid can be easily transported to the sixth transport line 6231.

FIG. 8 shows a combined cycle power plant 7000 according to an eighth embodiment of the present invention.

Referring to FIG. 8, the combined cycle power plant 7000 includes a gas turbine power generation system 7100, an operating fluid power generation system 7200, and a cooling system 7300.

The combined cycle power plant 7000 has a structure configured by adding a third transport line 7224, for causing a portion of the operating fluid supplied through the introduction line to bypass to the recovery line, to the structure of the combined cycle power plant 6000 according to the seventh embodiment. Thus, among the components of the combined cycle power plant 7000, description about the same components as those in the seventh embodiment will be omitted, and only the added component will be described.

The third transport line 7224 is connected to the introduction line 7310 at a first end thereof and connected to the recovery line 7330 at a second end thereof. A portion of the operating fluid supplied from the compressor 7210 is transported to the cooler 7320 through the introduction line 7310, and a portion of the operating fluid is transported to the recovery line 7330 through the third transport line 7224.

FIG. 9 shows a combined cycle power plant 8000 according to a ninth embodiment of the present invention.

Referring to FIG. 9, the combined cycle power plant 8000 includes a gas turbine power generation system 8100, an operating fluid power generation system 8200, and a cooling system 8300.

The combined cycle power plant 8000 has a structure configured by adding a fourth transport line 8270, a fifth transport line 8275, and an auxiliary turbine 8235 to the structure of the combined cycle power plant 7000 according to the eighth embodiment. Thus, among the components of the combined cycle power plant 8000, description about the same components as those in the eighth embodiment will be omitted, and only the added components will be described.

The fourth transport line 8270 is provided between the heat exchange unit 8220 and the operating fluid turbine 8250, thereby transporting the operating fluid discharged toward the heat exchange unit 8220 to the operating fluid turbine 8250. A first end of the fourth transport line 8270 is connected to a second heat exchanger 8222 of the heat exchange unit 8220, and a second end of the fourth transport line is connected to the operating fluid turbine 8250.

The fifth transport line 8275 branches off from the fourth transport line 8270. A first end of the fifth transport line 8275 is connected to the return line 8255, and the fifth transport line 8275 is provided with the auxiliary turbine 8251.

The fifth transport line 8275 transports a portion of the operating fluid introduced through the fourth transport line 8270 and supplies it to the auxiliary turbine 8251. The auxiliary turbine 8251 generates rotary driving power using the operating fluid transported through the fifth transport line 8275, and drives the compressor by supplying the rotary driving power to the compressor 8210.

FIG. 10 shows a combined cycle power plant 9000 according to a tenth embodiment of the present invention.

Referring to FIG. 10, the combined cycle power plant 9000 includes a gas turbine power generation system 9100, an operating fluid power generation system 9200, and a cooling system 9300.

The combined cycle power plant 9000 has a structure configured by adding a third heat exchanger 9224, a seventh transport line 9280, and an eighth transport line 9290, to the structure of the combined cycle power plant 7000 according to the eighth embodiment. Thus, among the components of the combined cycle power plant 9000, description about the same components as those in the eighth embodiment will be omitted, and only the added components will be described.

The third heat exchanger 9224 is arranged to be close to the second heat exchanger, to cause the heat exchange between the operating fluid passing through the second heat exchanger 9222 and a combustion gas discharged from the gas turbine, thereby heating the operating fluid. The operating fluid heated by the third heat exchanger 9224 is supplied to the operating fluid turbine 9250 and is used to generate electricity.

The combined cycle power plant according to the present embodiment performs heat exchange between the operating fluid and the combustion gas discharged from the gas turbine by using the first to third heat exchangers 9221, 9222, and 9224. Therefore, an area where the heat exchange between the operating fluid and the combustion gas is increased, so that the output power and the power generation efficiency of the combined cycle power plant are improved.

The seventh transport line 9280 is connected to the second heat exchanger 9222 at a first end thereof and connected to the third heat exchanger 9224 at a second end thereof, thereby transporting the operating fluid passing through the second heat exchanger 9222 to the third heat exchanger 9224. The eighth transport line 9290 is connected to the seventh transport line 9280 at a first end thereof and connected to the sixth transport line 9231 provided at a downstream side of the second recuperator 9235 at a second end thereof, thereby causing a portion of the operating fluid passing through the second recuperator 9235 to be transported to the seventh transport line 9280.

FIG. 11 shows a combined cycle power plant 10000 according to an eleventh embodiment of the present invention.

Referring to FIG. 11, the combined cycle power plant 10000 includes a gas turbine power generation system 10100, an operating fluid power generation system 10200, and a cooling system 10300.

The combined cycle power plant 10000 has a structure configured by adding a third transport line 10224, serving as a bypass line for causing a portion of the operating fluid supplied through the introduction line to be transported to a recovery line, to the structure of the combined cycle power plant 9000 according to the tenth embodiment. Thus, among the components of the combined cycle power plant 10000, description about the same components as those in the tenth embodiment will be omitted, and only the added component will be described.

The third transport line 10224 is connected to the introduction line 10310 at a first end thereof and connected to the recovery line 10330 at a second end thereof. A portion of the operating fluid supplied from the compressor 10210 is transported to the cooler 10320 through the introduction line 10310, and a portion of the operating fluid is transported to the recovery line 10330 through the third transport line 10224.

FIG. 12 shows a combined cycle power plant 11000 according to a twelfth embodiment of the present invention.

Referring to FIG. 12, the combined cycle power plant 11000 includes a gas turbine power generation system 11100, an operating fluid power generation system 11200, and a gas turbine air cooling system 11300.

The gas turbine power generation system 11100 for generating electricity using a gas turbine includes an air compressor 11110, a gas turbine 11120, and a first generator 11130.

The air compressor 11110 compresses external air introduced through an air incoming path 11111 and supplies the highly compressed external air to the gas turbine 11120. The gas turbine 11120 generates rotary power by burning a mixture of fuel and air. The first generator 11130 produces electricity by using the rotary power generated by the gas turbine 11120.

A combustion gas G discharged from the gas turbine 11120 is transported toward the operating fluid power generation system 11200.

The operating fluid power generation system 11200 includes a compressor 11210, a heat exchange unit 11220, a recuperator 11230, an operating fluid supply line 11240, a first transport line 11245, an operating fluid turbine 11250, a return line 11255, and a condenser 11260.

The heat exchange unit 11220 performs heat exchange between the hot combustion gas G passing through the gas turbine 11120 and the operating fluid, thereby increasing the temperature of the operating fluid.

The heat exchange unit 11220 includes a first heat exchanger 11221, a second heat exchanger 11222, and a third transport line 11223.

The first heat exchanger 11221 and the second heat exchanger 11222 are arranged to be close to each other such that the combustion gas G discharged from the gas turbine can sequentially pass through the first and second heat exchangers 11221 and 11222.

A first end of the third transport line 11223 is connected to the first heat exchanger 11221 and a second end of the third transport line 11223 is connected to a first transport line 11245 for supplying the operating fluid from the recuperator 11230 to the second heat exchanger 11222.

The first heat exchanger 11221 is connected to a second transport line 11246 that branches off from an operating fluid supply line 11240, thereby causing heat exchange between the operating fluid introduced through the second transport line 11246 and the combustion gas discharged from the gas turbine 11120, to increase the temperature of the operating fluid. The operating fluid passing through the first heat exchanger 11221 is transported to the first transport line 11245 through the third transport line 11223, and is mixed with the operating fluid transported through the first transport line. The resultant mixture of the operating fluids is then transported to the second heat exchanger 11222. The second heat exchanger 11222 causes heat exchange between the mixture of the operating fluids and the combustion gas discharged from the gas turbine 11120, thereby increasing the temperature of the operating fluid.

The compressor 11210 compresses the operating fluid and transports the resultant compressed operating fluid. In the present embodiment, carbon dioxide is used as the operating fluid. Although the present embodiment uses carbon dioxide as the operating fluid, a different material can be used as the operating fluid as long as the material can implement a power cycle and has an effect of cooling external air. The operation fluid compressed by the compressor 11210 is supplied to the heat exchange unit 11220.

The recuperator 11230 is arranged between the compressor 11210 and the heat exchange unit 11220. The compressor 11210 and the recuperator 11230 are connected to each other by the operating fluid supply line 11240. The operating fluid supply line 11240 is connected to the recuperator 11230 at a first end thereof and connected to the compressor 11210 at a second end thereof.

The recuperator 11230 and the second heat exchanger of the heat exchange unit 11220 are connected by the first transport line 11245. A first end of the first transport line 11245 is connected to the second heat exchanger 11222 of the heat exchange unit 11220 and a second end of the first transport line 11245 is connected to the recuperator 11230.

The recuperator 11230 heats the operating fluid discharged from the compressor 11210 and supplied through the operating fluid supply line 11240, and the heated operating fluid is supplied to the second heat exchanger 11222 of the heat exchange unit 11220 through the first transport line 11245.

A downstream side (toward the left in FIG. 1) of the heat exchange unit 11220 is provided with the operating fluid turbine 11250. The operating fluid turbine 11250 generates rotary driving power by receiving the operating fluid passing through the second heat exchanger 11222 of the heat exchange unit 11220, and produces electricity using the rotary driving power. A second generator 11251 is provided at one side of the operating fluid turbine 11250 to generate electricity.

The return line 11255 is arranged between the operating fluid turbine 11250 and the compressor 11210, thereby transporting the operating fluid discharged from the operating fluid turbine 11250 to the compressor 11210. A first end of the return line 11255 is connected to an outlet side of the operating fluid turbine 11250 and a second end of the return line 11255 is connected to an inlet side of the compressor 11210.

The return line 11255 is configured to extend through the recuperator 11230, thereby allowing heat exchange between the operating fluid flowing through the return line 11255 and the operating fluid introduced from the compressor 11210 to be performed in the recuperator so that the temperature of the operating fluid introduced from the compressor can be increased.

The operating fluid passing through the recuperator 11230 and flowing through the return line 11255 is transported to the condenser 11260. The condenser 11260 is provided on the return line 11255 to cool and condense the operating fluid flowing through the return line 11255.

The condenser 11260 includes a cooling body 11261, an LNG introduction pipe 11262, and an LNG discharge pipe 11263.

One side (lower side in FIG. 1) of the cooling body 11261 is provided with an operating fluid inlet 11261a through which the operating fluid supplied through the return line 11255 is introduced into the cooling body, and the other side (upper side in FIG. 1) of the cooling body 11261 is provided with an operating fluid outlet 11261b through which the operating fluid is discharged from the cooling body 11261.

A first end (toward the left in FIG. 1) of the cooling body 11261 is connected to an LNG introduction pipe 11262 through which LNG is introduced into the cooling body, and a second end (toward the right in FIG. 1) of the cooling body 11261 is connected to an LNG discharge pipe 11263 through which LNG is discharged from the cooling body.

The LNG externally supplied through the LNG introduction pipe 11262 is introduced into the cooling body, and functions to cool and condense the operating fluid flowing through the return line 11255. After that, the LNG is discharged from the cooling body through the LNG discharge pipe 11263. The second end of the cooling body 11261 is provided with a vaporizer 11264. A first portion of the vaporizer 11264 is connected to a sea water introduction pipe 11265 through which sea water is introduced, and a second portion of the vaporizer 1264 is connected to a sea water discharge pipe 11266 through which the sea water is discharged. The LNG discharged through the LNG discharge pipe 11263 performs heat exchange with the sea water introduced through the sea water introduction pipe 11265, thereby being gasified in the vaporizer 11264.

The gas turbine air cooling system 11300 is provided between the gas turbine power generation system 11100 and the operating fluid power generation system 11200.

The gas turbine air cooling system 11300 includes an introduction line 11310, a cooler 11320, a recovery line 11330, a temperature sensor 11340, and a controller 11350. The cooler 11320 is provided on an air incoming path 11111 arranged at an upstream side of the air compressor 11110. The introduction line 11310 branches off from the return line 11255 and is connected to the cooler 11320 at a first end thereof, thereby supplying the operating fluid to the cooler 11320. The introduction line 11310 is provided with an inflow control valve 11311 for controlling the flow of the operating fluid transported through the introduction line 11310.

The cooler 11320 causes heat exchange between the operating fluid supplied through the introduction line 11310 and external air introduced through the air incoming path 11111, thereby lowering the temperature of the external air. The cooled external air is supplied to the air compressor 11110. Therefore, the temperature of the air introduced into the air compressor 11110 of the gas turbine power generation system 11100 is lowered, and thus the power output and efficiency of the gas turbine power generation system 11200 are improved.

The recovery line 11330 is arranged between the cooler 11320 and the return line 11255. The recovery line 11330 is connected to the cooler 11320 at a first end thereof and connected to the return line 11255 at a second end thereof. The operating fluid passing through the cooler 11320 is transported to the condenser 11260 through the return line 11255.

The air incoming path 11111 is provided with a temperature sensor 11340 for measuring the temperature of air flowing through the air incoming path 11111. The temperature sensor 11340 includes a first temperature sensor 11341 and a second temperature sensor 11342.

The first temperature sensor 11341 is provided on the air incoming path provided at an upstream side of the cooler 11320 and measures the temperature of the air introduced to into the cooler 11320. The second temperature sensor 11342 is provided on the air incoming path 11320 provided at a downstream side of the cooler 11320 and measures the temperature of the air passing through the cooler.

The controller 11350 controls the opening and closing of the inflow control valve 11311 according to the temperature of the air measured by the temperature sensor 11340, and controls the flow rate of the operating fluid flowing through the introduction line 11310. The controller 11350 controls the flow rate of the operating fluid flowing through the introduction line 11310 according to the temperatures of air measured by the first temperature sensor 11341 and the second temperature sensor 11342, and controls the temperature of the air supplied to the air compressor 11110 through the air incoming path 11111.

As described above, the combined cycle power plant 11000 according to the twelfth embodiment lowers the temperature of the air supplied to the air compressor 11110 of the gas turbine power generation system 11100 and thus improves the power output and the efficiency of the gas turbine power generation system 11100. Furthermore, since the operating fluid absorbs the heat of the external air, the efficiency of the operating fluid power generation system 11200 also can be improved.

The combined cycle power plant 11000 according to the twelfth embodiment has a high raw cost reduction effect because it does not require a separate cooling cycle for lowering the temperature of air supplied to the air compressor 11110 of the gas turbine power generation system 11100.

The combined cycle power plant 11000 according to the twelfth embodiment cools and condenses carbon dioxide serving as the operating fluid by using waste cold energy of LNG, and generates electricity and cools air supplied to the gas turbine power generation system 11200 by using the cooled and condensed carbon dioxide, thereby increasing the overall power output and power generation efficiency thereof.

FIG. 13 shows a combined cycle power plant 12000 according to a thirteenth embodiment of the present invention.

Referring to FIG. 13, the combined cycle power plant 12000 includes a gas turbine power generation system 12100, an operating fluid power generation system 12200, and a cooling system 12300.

The combined cycle power plant 12000 has a structure configured by eliminating the first heat exchanger 11221, the second transport line 11246, and the third transport line 11223 from the structure of the combined cycle power plant 11000 of the twelfth embodiment.

The combined cycle power plant 12000 is structured such that all the operating fluid compressed by the compressor 12210 is transported to the second heat exchanger 12222 and heated by the second heat exchanger by performing heat exchange with the combustion gas supplied from the gas turbine 12120.

FIG. 14 shows a combined cycle power plant 13000 according to a fourteenth embodiment of the present invention.

Referring to FIG. 14, the combined cycle power plant 13000 includes a gas turbine power generation system 13100, an operating fluid power generation system 13200, and a cooling system 13300.

The combined cycle power plant 13000 has a structure configured by adding a fourth transport line 13270, a fifth transport line 13275, and an auxiliary turbine 13251 to the structure of the combined cycle power plant 11000 according to the twelfth embodiment. Thus, among the components of the combined cycle power plant 13000, description about the same components as those in the twelfth embodiment will be omitted, and only the added components will be described.

The fourth transport line 13270 is provided between the heat exchange unit 13220 and the operating fluid turbine 13250, and the operating fluid discharged from the heat exchange unit 13220 is transported to the operating fluid turbine 13250. A first end of the fourth transport line 13270 is connected to the second heat exchanger 13222 of the heat exchange unit 13220 and a second end of the fourth transport line 13270 is connected to the operating fluid turbine 13250.

The fifth transport line 13275 branches off from the fourth transport line 13270. The fifth transport line 13275 is connected to the return line 13255 at a first end thereof and the auxiliary turbine 13251 is installed on the fifth transport line 13275.

The fifth transport line 13275 transports a portion of the operating fluid introduced through the fourth transport line 13270 and supplies it to the auxiliary turbine 13251. The auxiliary turbine 13251 generates rotary driving power by using the operating fluid transported through the fifth transport line 13275, and drives the compressor 13210 by supplying the rotary driving power to the compressor 13210.

FIG. 15 shows a combined cycle power plant 14000 according to a fifteenth embodiment of the present invention.

Referring to FIG. 15, the combined cycle power plant 14000 includes a gas turbine power generation system 14100, an operating fluid power generation system 14200, and a cooling system 14300.

The combined cycle power plant 14000 has a structure configured by eliminating the first heat exchanger 13221, the second transport line 13246, and the third transport line 13223 from the structure of the combined cycle power plant 13000 according to the fourteenth embodiment.

The combined cycle power plant 14000 is structured such that all the operating fluid compressed by the compressor 14210 is transported to the second heat exchanger 14222, and is heated in the second heat exchanger 14222 through heat exchange with the combustion gas supplied from the gas turbine 14120.

FIG. 16 shows a combined cycle power plant 15000 according to a sixteenth embodiment of the present invention.

Referring to FIG. 16, the combined cycle power plant 15000 includes a gas turbine power generation system 15100, an operating fluid power generation system 15200, and a cooling system 15300.

The combined cycle power plant 15000 has a structure configured by adding a sixth transport line 15231 and a second recuperator 15235 to the structure of the combined cycle power plant 11000 according to the twelfth embodiment. Thus, among the components of the combined cycle power plant 15000, description about the same components as those in the twelfth embodiment will be omitted, and only the added components will be described.

The sixth transport line 15231 is connected to the third transport line 15223 at a first end thereof and connected to the return line 15255 at a second end thereof such that a portion of the operating fluid transported through the third transport line 15223 is transported to the return line 15255. In addition, the second recuperator 15235 is installed on the sixth transport line 15231.

The return line 15255 is installed to extend through the second recuperator 15235, so that the operating fluid flowing through the return line 15255 and the operating fluid introduced through the sixth transport line 15231 perform heat exchange with each other in the second recuperator 15235. Therefore, the temperature of the operating fluid introduced through the return line 15255 is lowered. The operating fluid that is cooled by the second recuperator 15235 is mixed with the operating fluid transported through the sixth transport line 15231, and is then transported to the first recuperator 15230. The operating fluid transported through the first recuperator 15230 is cooled further in the first recuperator 15230, by performing heat exchange with the operating fluid discharged from the compressor 15210. That is, the operating fluid transported through the return line 15255 is cooled by sequentially passing through the first and second recuperators 15230 and 15235. Therefore, the cooling efficiency is improved.

In addition, the sixth transport line 15231 is provided with an auxiliary pump 15236 such that the operating fluid can be easily transported to the sixth transport line 15231.

FIG. 17 shows a combined cycle power plant 16000 according to a seventeenth embodiment of the present invention.

Referring to FIG. 17, the combined cycle power plant 16000 includes a gas turbine power generation system 16100, an operating fluid power generation system 16200, and a cooling system 16300.

The combined cycle power plant 16000 has a structure configured by adding a fourth transport line 16270, a fifth transport line 16275, and an auxiliary turbine 16251 to the structure of the combined cycle power plant 15000 according to the sixteenth embodiment. Thus, among the components of the combined cycle power plant 16000, description about the same components as those in the sixteenth embodiment will be omitted, and only the added components will be described.

The fourth transport line 16270 is provided between the heat exchange unit 16220 and the operating fluid turbine 16250 such that the operating fluid discharged from the heat exchange unit 16220 is transported to the operating fluid turbine 16250. A first end of the fourth transport line 16270 is connected to the second heat exchanger 16222 of the heat exchange unit 16220, and a second end of the fourth transport line 16270 is connected to the operating fluid turbine 16250.

The fifth transport line 16275 branches off from the fourth transport line 16270. The fifth transport line 16275 is connected to the return line 16255 at a first end thereof, and the fifth transport line 16275 is provided with an auxiliary turbine 16251.

The fifth transport line 16275 transports a portion of the operating fluid introduced through the fourth transport line 16270, and supplies it to the auxiliary turbine 16251. The auxiliary turbine 16251 generates rotary driving power by using the operating fluid transported through the fifth transport line 16275, and drives the compressor 16210 by transferring the rotary driving power to the compressor 16210.

FIG. 18 shows a combined cycle power plant 17000 according to an eighteenth embodiment of the present invention.

Referring to FIG. 18, the combined cycle power plant 17000 includes a gas turbine power generation system 17100, an operating fluid power generation system 17200, and a cooling system 17300.

The combined cycle power plant 17000 has a structure configured by adding a third heat exchanger 17224, a seventh transport line 17280, and an eighth transport line 17290 to the structure of the combined cycle power plant 15000 according to the sixteenth embodiment. Thus, among the components of the combined cycle power plant 17000, a description about the same components as those in the sixteenth embodiment will be omitted, and only the added components will be described.

The third heat exchanger 17224 is arranged to be close to the second heat exchanger 17222. Therefore, the operating fluid passing through the second heat exchanger 17222 and the combustion gas discharged from the gas turbine can perform heat exchange with each other so that the operating fluid can be heated. The operating fluid heated by the third heat exchanger 17224 is supplied to the operating fluid turbine 17250 to generate electricity.

The combined cycle power plant 17000 is structured such that the operating fluid and the combustion gas discharged from the gas turbine undergo heat exchange in the first to third heat exchangers 17221, 17222, and 17224 of the heat exchange unit 17220. For this reason, the combined cycle power plant 17000 has a large heat exchange area, which results in an increase in the power output and power generation efficiency.

The seventh transport line 17280 is connected to the second heat exchanger 17222 at a first end thereof and connected to the third heat exchanger 17224 at a second end thereof, thereby transporting the operating fluid passing through the second heat exchanger 17222 to the third heat exchanger 17224. The eighth transport line 17290 is connected to the seventh transport line 17280 at a first end thereof and connected to the sixth transport line 17231 provided at a downstream side of the second recuperator 17235 at a second end thereof, thereby transporting a portion of the operating fluid passing through the second recuperator 17235 to the seventh transport line 17280.

Although the present invention has been described in conjunction with the exemplary embodiments and the accompanying drawings, the exemplary embodiments of the present invention are disclosed only for illustrative purposes and should not be construed as limiting the present invention. On the contrary, those skilled in the art will appreciate that various modifications, additions, and substitutions are possible, without departing from the scope and spirit of the invention as disclosed in the accompanying claims. Accordingly, the true scope of the present invention should be determined by the technical spirit of the appended claims.

What is claimed is:

1. A combined cycle power plant comprising:
   a gas turbine power generation system discharging a combustion gas;
   an operating fluid power generation system for heating an operating fluid using the discharged combustion gas and for generating electricity by using the operating fluid;
   a recuperator configured to heat the operating fluid supplied from the gas turbine power generation system and to supply the heated operating fluid to a heat exchange unit,
   a first transport line connected between the heat exchange unit and the recuperator to transport the operating fluid passing through the recuperator to the heat exchange unit,
   a second transport line connected between the heat exchange unit and the first transport line, and
   a cooling system for supplying the operating fluid to an upstream side of the gas turbine power generation system and for cooling air to be introduced into the gas turbine power generation system,
   wherein the cooling system includes a cooler to cool air supplied to the gas turbine power generation system, and a recovery line connected between the cooler disposed at the upstream side of the gas turbine power generation system and the heat exchanger unit of the operating fluid power generation system to transport the operating fluid passing through the cooler to the operating fluid power generation system so that the operating fluid power generation system increases heat absorption amount and increases power output,
   wherein the second transport line configured to supply the operating fluid from the recovery line to the first transport line.

2. The combined cycle power plant according to claim 1,
   wherein the gas turbine power generation system includes an air compressor for compressing air supplied to the gas turbine power generation system through an air incoming path, a gas turbine for generating rotary power by burning a mixture of fuel and the compressed air, and a first generator for generating electricity using the rotary power of the gas turbine, and
   wherein the cooled air is introduced into the gas turbine power generation system through the air incoming path.

3. A combined cycle power plant comprising:
   a gas turbine power generation system discharging a combustion gas;
   an operating fluid power generation system including:
   a heat exchange unit for heating an operating fluid using the discharged combustion gas,
   a compressor for compressing the operating fluid and for supplying the compressed operating fluid to the heat exchange unit,
   a recuperator arranged between the compressor and the heat exchange unit and configured to heat the operating fluid supplied from the compressor and to supply the heated operating fluid to the heat exchange unit,
   an operating fluid supply line connected between the compressor and the recuperator to transport the operating fluid from the compressor to the recuperator,
   a first transport line connected between the heat exchange unit and the recuperator to transport the operating fluid passing through the recuperator to the heat exchange unit,
   a second transport line connected between the heat exchange unit and the first transport line,
   an operating fluid turbine for generating electric power by using the operating fluid passing through the heat exchange unit,
   a return line connected between the operating fluid turbine and the compressor, and
   a condenser provided on the return line and configured to cool the operating fluid supplied to the compressor; and
   a gas turbine air cooling system including a cooler arranged at an upstream side of the gas turbine power generation system to cool air supplied to the gas turbine power generation system, by using the operating fluid supplied through an introduction line that branches off from the operating fluid supply line,
   wherein the operating fluid passing through the cooler is transported to the heat exchange unit via a recovery line connected between the cooler disposed at the upstream side of the gas turbine power generation system and the heat exchange unit of the operating fluid power generation system so that the heat exchange unit increases heat absorption amount and the operating fluid power generation system increases power output,
   the second transport line configured to supply the operating fluid from the recovery line to the first transport line.

4. The combined cycle power plant according to claim 3,
   wherein the heat exchange unit comprises:
   a first heat exchanger that heats the operating fluid by performing heat exchange between the operating fluid introduced through the recovery line and the discharged combustion gas, a second heat exchanger that heats the operating fluid passing through the first heat exchanger and the operating fluid supplied from the compressor by using the discharged combustion gas, and the second transport line connected between the first heat exchanger and the first transport line.

5. The combined cycle power plant according to claim 3, wherein the condenser comprises:

a cooling body having an operating fluid inlet through which the operating fluid is introduced at a first portion thereof and an operating fluid outlet through which the operating fluid is discharged at a second portion thereof;

an LNG introduction line connected to a first end of the cooling body such that liquid natural gas (LNG) is introduced into the cooling body through the LNG introduction line; and an LNG discharge line connected to a second end of the cooling body such that the LNG circulated through the cooling body is discharged from the cooling body through the LNG discharge line.

6. The combined cycle power plant according to claim 5, wherein the condenser further comprises a vaporizer provided on one side of the cooling body and configured to vaporize the LNG by performing heat exchange between the LNG passing through the cooling body and water, wherein the water is sea water.

7. The combined cycle power plant according to claim 5, wherein the operating fluid is carbon dioxide, and the condenser cools and condenses the operating fluid using the LNG.

8. The combined cycle power plant according to claim 3, further comprising an inflow control valve to control a flow of the operating fluid flowing through the introduction line, wherein the gas turbine air cooling system includes a temperature sensor that measures a temperature of the air supplied to the gas turbine power generation system, and a processor configured to control the inflow control valve according to the measured temperature.

9. The combined cycle power plant according to claim 8, wherein the temperature sensor includes a first temperature sensor arranged at an upstream side of the cooler and a second temperature sensor arranged at a downstream side of the cooler, and the processor controls the inflow control valve according to a temperature of the air measured by the first temperature sensor and a temperature of the air measured by the second temperature sensor.

10. The combined cycle power plant according to claim 3, further comprising:

a fourth transport line connected between the heat exchange unit and the operating fluid turbine, to transport the operating fluid discharged from the heat exchange unit to the operating fluid turbine;

a fifth transport line that branches off from the fourth transport line and connects to the return line at a first end thereof; and an auxiliary turbine provided on the fifth transport line and configured to generate driving power by using the operating fluid transported through the fifth transport line.

11. A combined cycle power plant comprising:

a gas turbine power generation system including an air compressor for compressing air supplied through an air incoming path, a gas turbine for generating rotary power by burning a mixture of fuel and air compressed by the air compressor, and a first generator for generating electricity using the rotary power of the gas turbine; an operating fluid power generation system including:

a heat exchange unit for heating an operating fluid using a combustion gas discharged from the gas turbine, a compressor for compressing the operating fluid and for supplying the compressed operating fluid to the heat exchange unit, a recuperator arranged between the compressor and the heat exchange unit, heating the operating fluid supplied from the compressor, and supplying the heated operating fluid to the heat exchange unit, an operating fluid supply line connected to the compressor at a first end thereof and connected to the recuperator at a second end thereof to transport the operating fluid from the compressor to the recuperator, a first transport line connected to the heat exchange unit at a first end thereof and connected to the recuperator at a second end thereof to supply the operating fluid passing through the recuperator to the heat exchange unit, an intermediate transport line connected between the heat exchange unit and the first transport line, an operating fluid turbine for generating electricity using the operating fluid passing through the heat exchange unit, a return line connected to the operating fluid turbine at a first end thereof and connected to the compressor at a second end thereof, and a condenser provided on the return line and cooling the operating fluid supplied to the compressor; and a gas turbine air cooling system including an introduction line that branches off from the return line and connects to an upstream side of the air compressor at a first end thereof to supply the operating fluid to the upstream side of the air compressor, a cooler arranged at the upstream side of the air compressor and cooling air supplied to the air compressor by using the operating fluid supplied through the introduction line, and a recovery line for transporting the operating fluid passing through the cooler to the return line, wherein the intermediate transport line configured to supply the operating fluid from the recovery line to the first transport line.

12. The combined cycle power plant according to claim 11, wherein a second transport line branches off from the operating fluid supply line, wherein the heat exchange unit includes:

a first heat exchanger for heating the operating fluid by performing heat exchange between the operating fluid introduced through the second transport line and the combustion gas discharged from the gas turbine, a second heat exchanger for heating the operating fluid passing through the first heat exchanger and the operating fluid supplied from the compressor by using the combustion gas discharged from the gas turbine, and the intermediate transport line is a third transport line connected to the first heat exchanger at a first end thereof and connected to the first transport line at a second end thereof.

13. The combined cycle power plant according to claim 11, further comprising an inflow control valve provided on the introduction line to control a flow of the operating fluid flowing through the introduction line,
   wherein the gas turbine air cooling system includes a temperature sensor for measuring a temperature of air flowing through the air incoming path and a controller for controlling opening and closing of the inflow control valve according to a temperature measured by the temperature sensor.

14. The combined cycle power plant according to claim 13, wherein the temperature sensor includes a first temperature sensor arranged at an upstream side of the cooler and a second temperature sensor arranged at a downstream side of the cooler, and
   wherein the controller controls the opening and closing of the inflow control valve based on a temperature of air measured by the first temperature sensor and a temperature of air measured by the second temperature sensor.

* * * * *